(12) United States Patent
Akkarakaran et al.

(10) Patent No.: US 12,213,178 B2
(45) Date of Patent: Jan. 28, 2025

(54) RANDOM ACCESS CHANNEL PROCEDURES WITH MULTIPLE CARRIERS

(71) Applicant: QUALCOMM Incorporated, San Diego, CA (US)

(72) Inventors: Sony Akkarakaran, Poway, CA (US); Tao Luo, San Diego, CA (US); Makesh Pravin John Wilson, San Diego, CA (US); Sumeeth Nagaraja, Los Altos, CA (US); Xiao Feng Wang, San Diego, CA (US); Kaushik Chakraborty, San Diego, CA (US); Wooseok Nam, San Diego, CA (US); Shengbo Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/142,622

(22) Filed: Jan. 6, 2021

(65) Prior Publication Data

US 2021/0127428 A1    Apr. 29, 2021

Related U.S. Application Data

(62) Division of application No. 16/046,781, filed on Jul. 26, 2018, now Pat. No. 10,893,540.

(Continued)

(51) Int. Cl.
*H04W 74/08* (2009.01)
*H04L 5/00* (2006.01)
(Continued)

(52) U.S. Cl.
CPC ......... *H04W 74/0833* (2013.01); *H04L 5/001* (2013.01); *H04W 74/002* (2013.01);
(Continued)

(58) Field of Classification Search
CPC . H04W 74/0833; H04W 74/02; H04W 74/08; H04W 74/00–008;
(Continued)

(56) References Cited

U.S. PATENT DOCUMENTS

| 9,130,698 B2 | 9/2015 | Khandekar et al. |
| 2010/0150092 A1* | 6/2010 | Aydin ................... H04L 5/0094 370/329 |

(Continued)

FOREIGN PATENT DOCUMENTS

| CN | 109039408 | * 12/2018 | ............ H04W 72/23 |
| CN | 109121223 | * 1/2019 | ............ H04W 74/00 |

(Continued)

OTHER PUBLICATIONS

Huawei et al., "Cross-Carrier Beam Management", 3GPP Draft, R1-1711410, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300598, 6 Pages, Retrieved from the Internet: URL:http://www.3gpp.org/ftp/Meetings_3GPP_SYNC/RAN1/Docs/ [retrieved on Jun. 26, 2017].

(Continued)

*Primary Examiner* — Warner Wong
(74) *Attorney, Agent, or Firm* — Holland & Hart / QUALCOMM Incorporated

(57) ABSTRACT

Methods, systems, and devices for wireless communication are described. Wireless communications systems may support uplink random access channel (RACH) transmissions on multiple beams and over multiple component carriers (CCs). A wireless device may transmit a random access preamble to a base station in a first RACH transmission, which may indicate a set of CCs over which the base station may respond with a random access response (RAR) in a (Continued)

second RACH transmission. The second RACH transmission may then include an indication for which CCs the wireless device may use for a subsequent RACH transmission (e.g., a RACH message 3). The wireless device may also indicate a beam index and/or time-frequency resources associated with beams and/or CCs used for such cell acquisition transmissions. In other examples, the base station may indicate resources (e.g., via a handover command or RACH command) for wireless device scheduling request and/or beam-failure recovery request transmission.

30 Claims, 22 Drawing Sheets

Related U.S. Application Data

(60) Provisional application No. 62/538,624, filed on Jul. 28, 2017.

(51) Int. Cl.
    *H04W 74/00* (2009.01)
    *H04W 74/0833* (2024.01)
    *H04W 36/00* (2009.01)

(52) U.S. Cl.
    CPC ....... *H04W 74/004* (2013.01); *H04W 74/006* (2013.01); *H04L 5/0035* (2013.01); *H04W 36/00692* (2023.05)

(58) Field of Classification Search
    CPC ........... H04W 36/0069; H04W 72/046; H04W 72/0453; H04L 5/001; H04L 5/0035; H04L 5/0098
    See application file for complete search history.

(56) References Cited

U.S. PATENT DOCUMENTS

| | | |
|---|---|---|
| 2010/0260136 A1 | 10/2010 | Fan et al. |
| 2010/0303039 A1 | 12/2010 | Zhang et al. |
| 2010/0322185 A1 | 12/2010 | Park et al. |
| 2011/0275374 A1 | 11/2011 | Narasimha et al. |
| 2012/0202501 A1 | 8/2012 | Morioka et al. |
| 2013/0010619 A1 | 1/2013 | Fong et al. |
| 2013/0010711 A1 | 1/2013 | Larsson et al. |
| 2013/0010964 A1* | 1/2013 | Fong .................... H04L 5/0094 370/329 |
| 2013/0258882 A1 | 10/2013 | Dinan |
| 2014/0269632 A1 | 9/2014 | Blankenship et al. |
| 2015/0036666 A1 | 2/2015 | Blankenship et al. |
| 2015/0071198 A1 | 3/2015 | Deng |
| 2015/0215829 A1 | 7/2015 | Chang et al. |
| 2015/0341132 A1 | 11/2015 | Hwang et al. |
| 2016/0135148 A1 | 5/2016 | Novlan et al. |
| 2016/0223639 A1* | 8/2016 | Davydov ................ H04L 5/001 |
| 2016/0330740 A1 | 11/2016 | Uchino et al. |
| 2016/0359593 A1 | 12/2016 | Dai et al. |
| 2017/0231055 A1 | 8/2017 | Yadav et al. |
| 2018/0110066 A1* | 4/2018 | Luo ................... H04W 72/1236 |
| 2018/0234960 A1* | 8/2018 | Nagaraja ........... H04W 36/0055 |
| 2018/0270895 A1* | 9/2018 | Park ..................... H04W 24/04 |
| 2018/0288755 A1 | 10/2018 | Liu et al. |
| 2019/0037423 A1* | 1/2019 | Yu ....................... H04B 7/0695 |
| 2019/0037604 A1 | 1/2019 | Akkarakaran et al. |
| 2019/0229777 A1* | 7/2019 | Guan ....................... H04L 5/00 |
| 2020/0068416 A1* | 2/2020 | Kang ................... H04W 72/21 |
| 2020/0137801 A1* | 4/2020 | Chen ................. H04W 74/0833 |
| 2020/0187128 A1* | 6/2020 | Yao ..................... H04W 52/325 |
| 2022/0376769 A1* | 11/2022 | Xiong .................... H04B 7/088 |

FOREIGN PATENT DOCUMENTS

| | | | | |
|---|---|---|---|---|
| CN | 113115324 | * | 7/2021 | ............ H04W 72/23 |
| EP | 2418907 A1 | | 2/2012 | |
| JP | 2016171597 A | | 9/2016 | |
| WO | WO-2010078365 A1 | | 7/2010 | |
| WO | WO-2010115304 A1 | | 10/2010 | |
| WO | WO-2010135706 | | 11/2010 | |
| WO | WO-2016160907 A1 | | 10/2016 | |
| WO | WO-2018126363 A1 | * | 7/2018 | ............... H04L 1/00 |
| WO | WO-2018202010 A1 | * | 11/2018 | ............. H04B 7/061 |
| WO | WO-2018202332 A1 | * | 11/2018 | ........ H04W 72/0453 |
| WO | WO-2018220773 A1 | * | 12/2018 | ........... H04L 1/1671 |
| WO | WO-2018224013 A1 | * | 12/2018 | ............... H04B 7/06 |
| WO | WO-2019128975 A1 | * | 7/2019 | ........... H04B 7/0695 |

OTHER PUBLICATIONS

Intel Corporation: "Cross-carrier QCL for NR", 3GPP Draft, R1-1704738, RAN WG1, Spokane, USA, Apr. 2, 2017, XP051242876, 2 Pages, Retrieved from the Internet: URL: http://www.3gpp.org/ftp/Meetings_3GPP_SYNC/RAN1/Docs/. [retrieved on Apr. 2, 2017].
Alcatel-Lucent Shanghai Bell, et al., "SR Transmissions on SCell PUCCH", 3GPP TSG-RAN WG2 Meeting #89bis, R2-151469, 3rd Generation Partnership Project, Mobile Competence Centre, 650, Route Des Lucioles, F-06921 Sophia-Antipolis Cedex, France, vol. RAN WG2, No. Bratislava, Slovakia, Apr. 20, 2015-Apr. 24, 2015, Apr. 19, 2015, XP050936396, 3 pages.
European Search Report—EP23174707—Search Authority—The Hague—dated Aug. 23, 2023.
Huawei, et al., "RAN2 Aspects of DL Beam Management", 3GPP TSG-RAN WG2 Meeting NR#2, R2-1706718, 3rd Generation Partnership Project, Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 26, 2017, XP051301218, 4 pages, section 2.1.
Qualcomm Incorporated: "Beam Recovery Request", 3GPP TSG-RAN WG2 Meeting NR ad-hoc, R2-1706926, 3rd Generation Partnership Project, Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 26, 2017, XP051301423, pp. 1-3, section 2.
Alcatel-Lucent., et al., "DL-UL Linking with Non-Contention RACH and UL Grant Assignment", 3GPP Draft; R2-102366, Dedicated Preamble_06, 3rd Generation Partnership Project (3GPP), Mobile Competence Centre; 650, Route Des Lucioles; F-06921, Sophia-Antipolis Cedex; France, vol. RAN WG2, No. Beijing. china; Apr. 12, 2010, Apr. 6, 2010 (Apr. 6, 2010), 4 pages, XP050422653, [retrieved on Apr. 6, 2010].
Huawei: "Random Access with Asymmetric Carrier Aggregation", 3GPP Draft; R2-102151 Random Access with Asymmetric Carrier Aggregation, 3rd Generation Partnership Project (3GPP), Mobile Competence Centre ; 650, Route Des Lucioles ; F-06921, Sophia-Antipolis Cedex; France, vol. RAN WG2, No. Beijing, China; Apr. 12, 2010-Apr. 16, 2010, Apr. 5, 2010 (Apr. 5, 2010), XP050605055, [retrieved on Apr. 5, 2010].
International Preliminary Report on Patentability—PCT/US2018/044194, The International Bureau of WIPO—Geneva, Switzerland, dated Feb. 6, 2020.
International Search Report and Written Opinion—PCT/US2018/044194—ISA/EPO—dated Nov. 30, 2018.
Partial International Search Report—PCT/US2018/044194—ISA/EPO—dated Oct. 9, 2018.

* cited by examiner

RANDOM ACCESS CHANNEL PROCEDURES WITH MULTIPLE CARRIERS

CROSS REFERENCES

The present Application for Patent is a Divisional of U.S. patent application Ser. No. 16/046,781 by AKKARAKARAN, et al., entitled "RANDOM ACCESS CHANNEL PROCEDURES WITH MULTIPLE CARRIERS" filed Jul. 26, 2018, which claims the benefit of U.S. Provisional Patent Application No. 62/538,624 by AKKARAKARAN, et al., entitled "RANDOM ACCESS CHANNEL PROCEDURES WITH MULTIPLE CARRIERS," filed Jul. 28, 2017, assigned to the assignee hereof, and expressly incorporated herein.

BACKGROUND

The following relates generally to wireless communication, and more specifically to random access channel (RACH) procedures with multiple carriers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some wireless systems, base stations and UEs may communicate using directional transmissions (e.g., receive beams and/or transmit beams), where beamforming techniques may be applied using one or more antenna arrays to generate beams in different directions. Such multi-beam transmission techniques may be associated with robust communications and coverage enhancements. It may thus be desirable to implement multi-beam operation as early as possible for communications between a UE and base station, such as during initial access to a cell. However, beam links (e.g., receive beam and transmit beam pairs) may become misaligned, resulting in beam failure. Further, in cases where multiple UEs are attempting to connect to the same base station, other resources (e.g., component carriers) associated with certain cell acquisition transmissions may become overloaded. Improved cell acquisition methods for allocation and selection of resources (e.g., allocation of component carriers, selection of beams, etc.) may thus be desired.

SUMMARY

The described techniques relate to improved methods, systems, devices, or apparatuses that support random access channel (RACH) procedures with multiple carriers. A user equipment (UE) may receive, from a base station, an indication of a set of component carriers (CCs). The indicated set of CCs may be used to receive, from a base station, a response to a first RACH transmission (e.g., a base station, the base station that sent the indication or a second neighboring base station, may transmit a random access response (RAR) via the indicated set of CCs). The UE may then transmit the first RACH transmission to the base station and receive, using one or more CCs of the set of CCs, the second RACH transmission responsive to the first RACH transmission (e.g., the RAR).

In other examples, a base station may send an indication of a set of CCs that the UE can use to transmit scheduling requests (SRs) or beam-failure recovery requests (BFRRs) to the base station. The base station may send the indication via a RACH command, a handover command, a timing-adjustment command, etc. The UE may then transmit, based at least in part on the received indication and using one or more CCs of the indicated set of CCs, a SR or a BFRR to the base station.

Described techniques may further include monitoring, by a wireless device, one or more of a plurality of cells serving a UE for a beam failure. The one or more cells may be cells that are quasi co-located with a primary cell (PCell) serving the UE or a primary secondary cell (PSCell) serving the UE. The wireless device may then identify a beam failure for at least one of the one or more cells serving the UE, and perform a radio link management procedure based at least in part on the identified beam failure.

A method of wireless communication is described. The method may include receiving, from a first base station, an indication of a set of component carriers for the UE to use to receive, from a second base station, a response to a first RACH transmission, transmitting the first RACH transmission to the second base station, and receiving, using one or more of the set of component carriers, the second RACH transmission responsive to the first RACH transmission.

An apparatus for wireless communication is described. The apparatus may include means for receiving, from a first base station, an indication of a set of component carriers for the UE to use to receive, from a second base station, a response to a first RACH transmission, means for transmitting the first RACH transmission to the second base station, and means for receiving, using one or more of the set of component carriers, the second RACH transmission responsive to the first RACH transmission.

Another apparatus for wireless communication is described. The apparatus may include a processor, memory in electronic communication with the processor, and instructions stored in the memory. The instructions may be operable to cause the processor to receive, from a first base station, an indication of a set of component carriers for the UE to use to receive, from a second base station, a response to a first RACH transmission, transmit the first RACH transmission to the second base station, and receive, using one or more of the set of component carriers, the second RACH transmission responsive to the first RACH transmission.

A non-transitory computer readable medium for wireless communication is described. The non-transitory computer-readable medium may include instructions operable to cause a processor to receive, from a first base station, an indication of a set of component carriers for the UE to use to receive, from a second base station, a response to a first RACH transmission, transmit the first RACH transmission to the second base station, and receive, using one or more of the set of component carriers, the second RACH transmission responsive to the first RACH transmission.

In some examples of the method, apparatus, and non-transitory computer-readable medium described above, the first base station and the second base station may be a same base station.

In some examples of the method, apparatus, and non-transitory computer-readable medium described above, the first base station and the second base station may be different base stations.

In some examples of the method, apparatus, and non-transitory computer-readable medium described above, receiving the indication of the set of component carriers comprises: receiving a command from the first base station, wherein the first RACH transmission may be transmitted based at least in part on the received command. Some examples of the method, apparatus, and non-transitory computer-readable medium described above may further include processes, features, means, or instructions for identifying the indication of the set of component carriers based at least in part on the command.

In some examples of the method, apparatus, and non-transitory computer-readable medium described above, the command comprises a handover command or a command to transmit a RACH transmission.

In some examples of the method, apparatus, and non-transitory computer-readable medium described above, identifying the indication of the set of component carriers based at least in part on the command comprises: identifying, in the command, indicators for each respective component carrier of the set of component carriers.

In some examples of the method, apparatus, and non-transitory computer-readable medium described above, identifying the indication of the set of component carriers based at least in part on the command comprises: identifying a resource used to carry the command, wherein the indication of the set of component carriers may be based at least in part on the identified resource.

In some examples of the method, apparatus, and non-transitory computer-readable medium described above, the identified resource comprises a component carrier, or a resource carrying a physical downlink control channel (PDCCH) bearing the command, or a resource carrying a physical downlink shared channel (PDSCH) bearing the command, or a combination thereof.

In some examples of the method, apparatus, and non-transitory computer-readable medium described above, receiving the indication of the set of component carriers comprises: receiving an allocation of physical random access channel (PRACH) resources for the UE to use to transmit RACH transmissions. Some examples of the method, apparatus, and non-transitory computer-readable medium described above may further include processes, features, means, or instructions for identifying the set of component carriers based at least in part on the PRACH resources.

In some examples of the method, apparatus, and non-transitory computer-readable medium described above, the PRACH resources comprise a component carrier, or a sequence identifier, or a time-frequency resource, or a beam direction, or a combination thereof.

In some examples of the method, apparatus, and non-transitory computer-readable medium described above, receiving the indication of the set of component carriers comprises: receiving the indication in a radio resource control (RRC) message, or a media access control (MAC) control element (CE), or a downlink control information (DCI), or a group-common DCI, or a handover command, or a combination thereof.

In some examples of the method, apparatus, and non-transitory computer-readable medium described above, the set of component carriers may be quasi co-located component carriers.

In some examples of the method, apparatus, and non-transitory computer-readable medium described above, the indication of the set of component carriers identifies the component carriers within a previously configured subset of component carriers.

In some examples of the method, apparatus, and non-transitory computer-readable medium described above, the subset of component carriers comprise quasi co-located component carriers.

Some examples of the method, apparatus, and non-transitory computer-readable medium described above may further include processes, features, means, or instructions for identifying that the set of component carriers comprises activated component carriers based at least in part on the received indication of the set of component carriers.

In some examples of the method, apparatus, and non-transitory computer-readable medium described above, the first RACH transmission comprises a random access preamble. In some examples of the method, apparatus, and non-transitory computer-readable medium described above, the second RACH transmission comprises a random access response.

A method of wireless communication is described. The method may include transmitting an indication of a set of component carriers for a UE to use to receive, from a second base station, a response to a first RACH transmission, receiving the first RACH transmission from the UE, and transmitting, using one or more of the set of component carriers, a second RACH transmission in response to the received first RACH transmission.

An apparatus for wireless communication is described. The apparatus may include means for transmitting an indication of a set of component carriers for a UE to use to receive, from a second base station, a response to a first RACH transmission, means for receiving the first RACH transmission from the UE, and means for transmitting, using one or more of the set of component carriers, a second RACH transmission in response to the received first RACH transmission.

Another apparatus for wireless communication is described. The apparatus may include a processor, memory in electronic communication with the processor, and instructions stored in the memory. The instructions may be operable to cause the processor to transmit an indication of a set of component carriers for a UE to use to receive, from a second base station, a response to a first RACH transmission, receive the first RACH transmission from the UE, and transmit, using one or more of the set of component carriers, a second RACH transmission in response to the received first RACH transmission.

A non-transitory computer readable medium for wireless communication is described. The non-transitory computer-readable medium may include instructions operable to cause a processor to transmit an indication of a set of component carriers for a UE to use to receive, from a second base station, a response to a first RACH transmission, receive the first RACH transmission from the UE, and transmit, using one or more of the set of component carriers, a second RACH transmission in response to the received first RACH transmission.

A method of wireless communication is described. The method may include transmitting an indication of a set of component carriers that the UE can use to receive a response to a RACH transmission to a base station, transmitting a first RACH transmission to the base station, and receiving, using one or more of the set of component carriers, a second RACH transmission in response to the first RACH transmission. The indication may further indicate a maximum number of component carriers on which the UE takes measurements.

An apparatus for wireless communication is described. The apparatus may include means for transmitting an indication of a set of component carriers that the UE can use to receive a response to a RACH transmission to a base station, means for transmitting a first RACH transmission to the base station, and means for receiving, using one or more of the set of component carriers, a second RACH transmission in response to the first RACH transmission. The indication may further indicate a maximum number of component carriers on which the UE takes measurements.

Another apparatus for wireless communication is described. The apparatus may include a processor, memory in electronic communication with the processor, and instructions stored in the memory. The instructions may be operable to cause the processor to transmit an indication of a set of component carriers that the UE can use to receive a RACH transmission to a base station, transmit a first RACH transmission to the base station, and receive, using one or more of the set of component carriers, a second RACH transmission in response to the first RACH transmission. The indication may further indicate a maximum number of component carriers on which the UE takes measurements.

A non-transitory computer readable medium for wireless communication is described. The non-transitory computer-readable medium may include instructions operable to cause a processor to transmit an indication of a set of component carriers that the UE can use to receive a response to a RACH transmission to a base station, transmit a first RACH transmission to the base station, and receive, using one or more of the set of component carriers, a second RACH transmission in response to the first RACH transmission. The indication may further indicate a maximum number of component carriers on which the UE takes measurements.

Some examples of the method, apparatus, and non-transitory computer-readable medium described above may further include processes, features, means, or instructions for identifying one or more cells with whom the UE may have acquired downlink synchronization, wherein the indication of the set of component carriers comprises a cell identifier for each respective cell of the one or more cells.

Some examples of the method, apparatus, and non-transitory computer-readable medium described above may further include processes, features, means, or instructions for receiving a system information transmission on a first component carrier, wherein the system information transmission includes the indication of the set of component carriers.

In some examples of the method, apparatus, and non-transitory computer-readable medium described above, the indication of the set of component carriers may be transmitted as part of the first RACH transmission.

Some examples of the method, apparatus, and non-transitory computer-readable medium described above may further include processes, features, means, or instructions for identifying, based at least in part on the received second RACH transmission, a component carrier index for a third RACH transmission.

In some examples of the method, apparatus, and non-transitory computer-readable medium described above, the third RACH transmission comprises a third message of a four-step RACH procedure, or an acknowledgement message of a two-step RACH procedure.

Some examples of the method, apparatus, and non-transitory computer-readable medium described above may further include processes, features, means, or instructions for receiving a physical downlink control channel (PDCCH) of the second RACH transmission. Some examples of the method, apparatus, and non-transitory computer-readable medium described above may further include processes, features, means, or instructions for identifying, based at least in part on the received PDCCH, a first component carrier of the indicated set of component carriers that carries a physical downlink shared channel (PDSCH) of the second RACH transmission.

In some examples of the method, apparatus, and non-transitory computer-readable medium described above, the first component carrier of the indicated set of component carriers carries the PDCCH and the PDSCH.

In some examples of the method, apparatus, and non-transitory computer-readable medium described above, a second component carrier of the indicated set of component carriers carries the PDCCH, the second component carrier being a different component carrier than the first component carrier.

A method of wireless communication is described. The method may include receiving, from a UE an indication of a set of component carriers that the UE can use to receive a response to a RACH transmission from the base station, receiving a first RACH transmission from the UE, and transmitting, to the UE using one or more of the set of component carriers, a second RACH transmission in response to the first RACH transmission.

An apparatus for wireless communication is described. The apparatus may include means for receiving, from a UE an indication of a set of component carriers that the UE can use to receive a response to a RACH transmission from the base station, means for receiving a first RACH transmission from the UE, and means for transmitting, to the UE using one or more of the set of component carriers, a second RACH transmission in response to the first RACH transmission.

Another apparatus for wireless communication is described. The apparatus may include a processor, memory in electronic communication with the processor, and instructions stored in the memory. The instructions may be operable to cause the processor to receive, from a UE an indication of a set of component carriers that the UE can use to receive a response to a RACH transmission from the base station, receive a first RACH transmission from the UE, and transmit, to the UE using one or more of the set of component carriers, a second RACH transmission in response to the first RACH transmission.

A non-transitory computer readable medium for wireless communication is described. The non-transitory computer-readable medium may include instructions operable to cause a processor to receive, from a UE an indication of a set of component carriers that the UE can use to receive a response to a RACH transmission from the base station, receive a first RACH transmission from the UE, and transmit, to the UE using one or more of the set of component carriers, a second RACH transmission in response to the first RACH transmission.

A method of wireless communication is described. The method may include receiving, from a base station, an indication of a set of component carriers that the UE can use to transmit scheduling requests or beam-failure recovery requests to a base station and transmitting, based at least in part on the received indication and using one or more component carriers of the indicated set of component carriers, a scheduling request or a beam-failure recovery request to the base station.

An apparatus for wireless communication is described. The apparatus may include means for receiving, from a base station, an indication of a set of component carriers that the UE can use to transmit scheduling requests or beam-failure recovery requests to a base station and means for transmitting, based at least in part on the received indication and using one or more component carriers of the indicated set of component carriers, a scheduling request or a beam-failure recovery request to the base station.

Another apparatus for wireless communication is described. The apparatus may include a processor, memory in electronic communication with the processor, and instructions stored in the memory. The instructions may be operable to cause the processor to receive, from a base station, an indication of a set of component carriers that the UE can use to transmit scheduling requests or beam-failure recovery requests to a base station and transmit, based at least in part on the received indication and using one or more component carriers of the indicated set of component carriers, a scheduling request or a beam-failure recovery request to the base station.

A non-transitory computer readable medium for wireless communication is described. The non-transitory computer-readable medium may include instructions operable to cause a processor to receive, from a base station, an indication of a set of component carriers that the UE can use to transmit scheduling requests or beam-failure recovery requests to a base station and transmit, based at least in part on the received indication and using one or more component carriers of the indicated set of component carriers, a scheduling request or a beam-failure recovery request to the base station.

In some examples of the method, apparatus, and non-transitory computer-readable medium described above, the indication of the set of component carriers reserves the set of component carriers for the UE to use to transmit scheduling requests or beam-failure recovery requests to a base station.

In some examples of the method, apparatus, and non-transitory computer-readable medium described above, transmitting the beam-failure recovery request to the base station comprises: identifying loss of beam synchronization for a single component carrier of the set of component carriers. Some examples of the method, apparatus, and non-transitory computer-readable medium described above may further include processes, features, means, or instructions for transmitting the beam-failure recovery request for the single component carrier.

In some examples of the method, apparatus, and non-transitory computer-readable medium described above, transmitting the beam-failure recovery request to the base station comprises: identifying loss of beam synchronization for a single component carrier of the set of component carriers. Some examples of the method, apparatus, and non-transitory computer-readable medium described above may further include processes, features, means, or instructions for transmitting the beam-failure recovery request for the set of component carriers.

Some examples of the method, apparatus, and non-transitory computer-readable medium described above may further include processes, features, means, or instructions for monitoring for beam failure of at least one component carrier for each group of component carriers of the set of component carriers.

A method of wireless communication is described. The method may include transmitting, to a UE, an indication of a set of component carriers that the UE can use to transmit scheduling requests or beam-failure recovery requests to the base station and receiving, based at least in part on the transmitted indication and using one or more component carriers of the indicated set of component carriers, a scheduling request or a beam-failure recovery request from the UE.

An apparatus for wireless communication is described. The apparatus may include means for transmitting, to a UE, an indication of a set of component carriers that the UE can use to transmit scheduling requests or beam-failure recovery requests to the base station and means for receiving, based at least in part on the transmitted indication and using one or more component carriers of the indicated set of component carriers, a scheduling request or a beam-failure recovery request from the UE.

Another apparatus for wireless communication is described. The apparatus may include a processor, memory in electronic communication with the processor, and instructions stored in the memory. The instructions may be operable to cause the processor to transmit, to a UE, an indication of a set of component carriers that the UE can use to transmit scheduling requests or beam-failure recovery requests to the base station and receive, based at least in part on the transmitted indication and using one or more component carriers of the indicated set of component carriers, a scheduling request or a beam-failure recovery request from the UE.

A non-transitory computer readable medium for wireless communication is described. The non-transitory computer-readable medium may include instructions operable to cause a processor to transmit, to a UE, an indication of a set of component carriers that the UE can use to transmit scheduling requests or beam-failure recovery requests to the base station and receive, based at least in part on the transmitted indication and using one or more component carriers of the indicated set of component carriers, a scheduling request or a beam-failure recovery request from the UE.

A method of wireless communication is described. The method may include monitoring one or more of a plurality of cells serving a UE for beam failure, the one or more cells quasi co-located with a PCell serving the UE or a PSCell serving the UE, identifying a beam failure for at least one of the one or more cells serving the UE, and performing a radio link management procedure based at least in part on the identified beam failure.

An apparatus for wireless communication is described. The apparatus may include means for monitoring one or more of a plurality of cells serving a UE for beam failure, the one or more cells quasi co-located with a PCell serving the UE or a PSCell serving the UE, means for identifying a beam failure for at least one of the one or more cells serving the UE, and means for performing a radio link management procedure based at least in part on the identified beam failure.

Another apparatus for wireless communication is described. The apparatus may include a processor, memory in electronic communication with the processor, and instructions stored in the memory. The instructions may be operable to cause the processor to monitor one or more of a plurality of cells serving a UE for beam failure, the one or more cells quasi co-located with a PCell serving the UE or a PSCell serving the UE, identify a beam failure for at least one of the one or more cells serving the UE, and perform a radio link management procedure based at least in part on the identified beam failure.

A non-transitory computer readable medium for wireless communication is described. The non-transitory computer-readable medium may include instructions operable to cause a processor to monitor one or more of a plurality of cells serving a UE for beam failure, the one or more cells quasi co-located with a PCell serving the UE or a PSCell serving the UE, identify a beam failure for at least one of the one or more cells serving the UE, and perform a radio link management procedure based at least in part on the identified beam failure.

Some examples of the method, apparatus, and non-transitory computer-readable medium described above may further include processes, features, means, or instructions for sending an indication of the identified beam failure from a physical layer of the wireless device to an upper layer of the wireless device.

DETAILED DESCRIPTION

Figure 1:
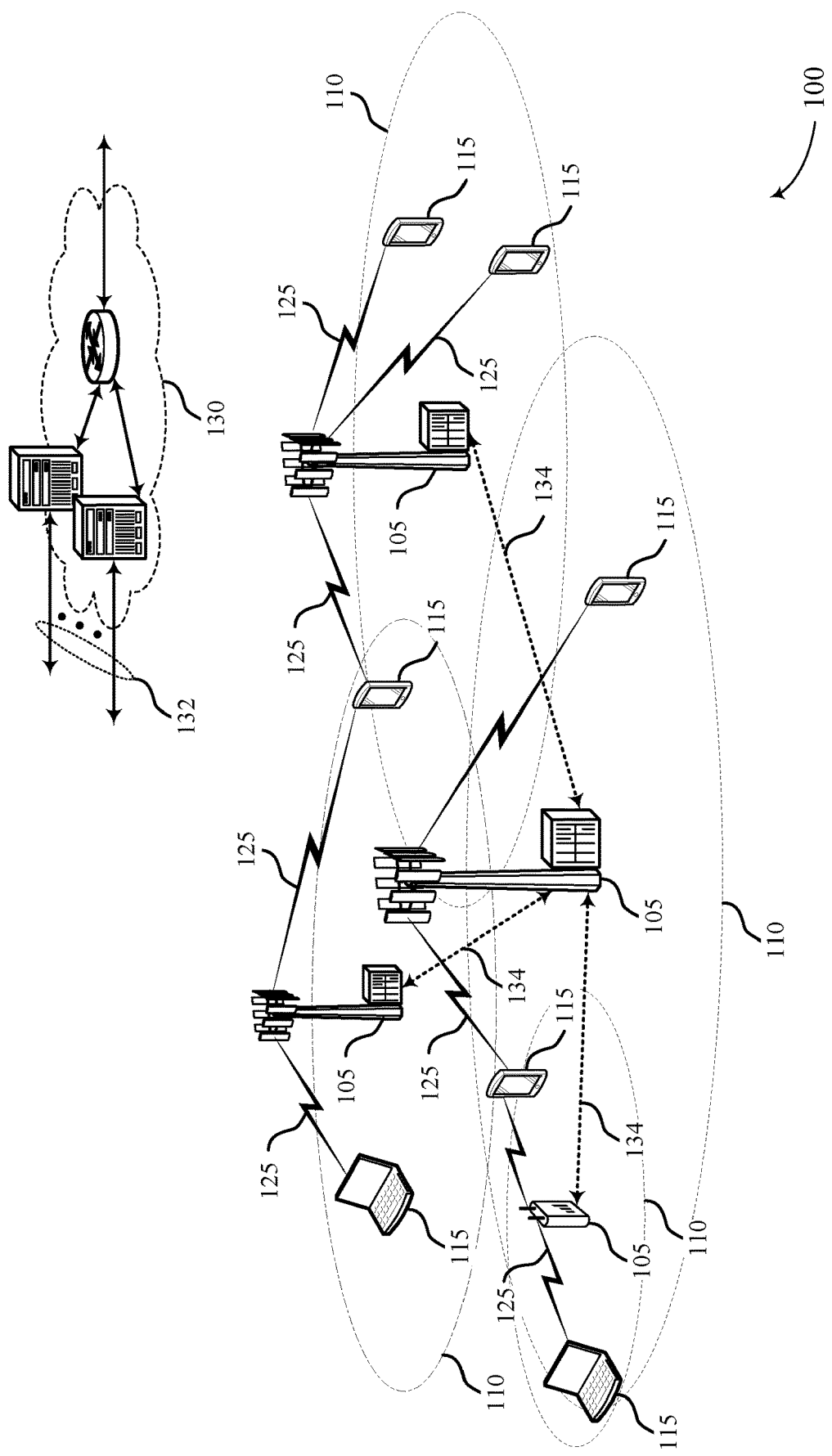
FIG. 1 illustrates an example of a system for wireless communication that supports random access channel (RACH) procedures with multiple carriers in accordance with aspects of the present disclosure.

Some wireless communication systems may support beamformed transmissions between a base station and a user equipment (UE). For example, some systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, or 8 antenna ports) associated with arrays of antennas to form beams in various directions using a number of analog weighting factors (e.g., antenna configurations). For example, as a base station transmits downlink signals using directional beams, a UE may also utilize beamforming for the UE's own directional receive beams and its uplink transmit beams for uplink transmissions to the base station. Accordingly, when attempting to access a network when the UE has data to communicate, the UE may use beamforming techniques for random access channel (RACH) transmissions for RACH messages. Such RACH procedures may include multiple RACH messages exchanged between a base station and a UE to establish a connection.

Techniques for improved beam selection and resource allocation for cell acquisition procedures described herein may provide for improved system performance (e.g., due to improved beam-failure recovery, improved resource load balancing, etc.). Specifically, techniques may allow for cell acquisition related transmissions (e.g., a random access response (RAR), other RACH messages, scheduling request (SR), beam-failure recovery request (BFRR), etc.) via one or more of multiple CCs for greater scheduling flexibility. Further, UEs and base stations may indicate such CCs via explicit indications (e.g., handover commands from a base station) and/or implicit indications (e.g., implied from resources used to carry certain messages, such as handover commands, or RACH commands).

That is, techniques described in more detail below provide for uplink RACH transmissions on multiple beams and over multiple CCs. For example, a UE may transmit a random access preamble to a base station in a first RACH transmission (e.g., a random access preamble of a 4-stage RACH procedure, or a message 1 of a 2-stage RACH procedure), which may indicate a set of CCs over which the base station may respond with a second RACH transmission (e.g., a RAR of a 4-stage RACH procedure, or a message 2 of a 2-stage RACH procedure). The second RACH transmission may then include an indication for which CCs the UE may use for a subsequent RACH transmission (e.g., a RACH message 3 of a 4-stage RACH procedure, or a message 2 acknowledgement of a 2-stage RACH procedure). For example, the base station may identify CCs that the UE may use for a third RACH transmission based on the reception of the first RACH transmission from the UE (e.g., which includes a set of CCs supported for the RAR). Further, the base station may also indicate a beam index and/or time-frequency resources associated with beams and/or CCs used for such cell acquisition transmissions.

Indications of RAR CCs (e.g., CCs indicated by a UE or base station for subsequent RAR reception) may indicate any CC, quasi co-located (QCL) CCs (e.g., CCs associated with the same beam direction), or a specific set of CCs. The indication may be sent via a first RACH message (e.g., RACH message 1, a random access preamble). The indication of the CCs may be conveyed via a RACH sequence or RACH resources used, an explicit indication in a RACH message payload, etc. In cases where multiple UEs attempt to connect with the same cell, the base station may then select CCs for RAR transmission to the multiple UEs to balance uplink CC and downlink CC loads based on the received indications. Further, resources for RACH-like transmission of other signals (e.g., SRs, BFRRs, etc.) may similarly be reserved on multiple CCs. According to other aspects of the disclosure, a base station may transmit an indication of a set of cells for a UE to monitor for beam failure. In cases where a UE identifies a beam failure condition for one or more cells serving the UE, the UE may use this event as input in its radio link monitoring procedure, which may, for example, result in sending or passing a radio link failure (RLF) indication from the lower layers (e.g., physical layer) of the UE to the upper layers (e.g., software or application layer, radio resource control (RRC) layer, etc.) of the UE. A beam-failure event may be triggered based on monitoring a primary cell (PCell), a primary secondary cell (PSCell), and/or other cells that are QCL with the PCell or PSCell. For example, other cells QCL with the PCell or PSCell may be monitored to determine a beam-failure event associated with the PCell or PSCell, while such monitoring is not limited to monitoring the PCell and/or the PSCell directly.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. A scheme for RACH procedures with multiple carriers as well as example process flows illustrating aspects of the disclosure are then described. Aspects of the disclosure are further illustrated by and described with reference to apparatus diagrams, system diagrams, and flowcharts that relate to RACH procedures with multiple carriers.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system may support the use of multiple beam transmissions during random access procedures, such as when sending RACH transmissions to a base station following a transmission of a RACH preamble.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 115 may receive one or more system information blocks (SIBs). For example, SIB1 may contain cell access parameters and scheduling information for other Ms. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain RRC configuration information related to RACH procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble (e.g., in RACH message 1) to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response (e.g., in RACH message 2) that provides an uplink resource grant, a timing advance, and a temporary cell radio network temporary identifier (C-RNTI). The UE 115 may then transmit an RRC connection request (e.g., in RACH message 3) along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., in RACH message 4) addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

As described herein, the use of multiple beams may be implemented early in the cell random access process. For instance, the UE 115 may utilize multiple beams for one or more of the transmissions of the RRC connection process, where the base station 105 may provide an indication of the beams to use for a RACH transmission within the preceding random access response from base station 105, such as a second RACH transmission. Such techniques may enable robust transmission schemes for random access procedures, and may further lead to efficient communications between the base station 105 and UE 115 following the random access procedure. For example, the base station 105 may use information obtained during RRC connection setup to configure robust multiple beam communications with the UE 115 (e.g., to transmit acknowledgement (ACK) signals using different beams, which beam was used due to mobility or a deployment type of the UE 115, etc.).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing multiple carrier modulation (MCM) techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communications system 100, UEs 115 and base stations 105, may communicate over one or more active beams, which may correspond to a transmit beam used at the transmitting device and a receive beam at a receiving device (e.g., a beam pair). In some cases, the active beam pair(s) may become misaligned (e.g., due to beam switch failure, signal blockage, UE mobility, etc.) such that the UE and base station may not be able to communicate over the obstructed active beam pair(s) due to the beam failure. Various techniques as discussed herein may provide for the identification that a certain beam has failed, and beam recovery. In some cases, a UE 115 may detect a failure in a downlink beam or an uplink beam, and initiate a beam recovery. In other cases, a base station 105 may detected a failure in a downlink beam or an uplink beam, and initiate a beam recovery.

Wireless communications system 100 may support uplink RACH transmissions on multiple beams and over multiple CCs. For example, a UE 115 may transmit a random access preamble to a base station 105 in a first RACH transmission, which may indicate a set of CCs over which the base station 105 may respond with a RAR in a second RACH transmission. The second RACH transmission may then include an indication for which CCs the UE 115 may use for a subsequent RACH transmission (e.g., a RACH message 3). For example, the base station 105 may identify CCs that the UE 115 may use for a third RACH transmission based on the reception of the first RACH transmission from the UE 115 (e.g., which includes a set of CCs supported for the RAR). Further, the UE 115 may also indicate a beam index and/or time-frequency resources associated with beams and/or CCs used for such cell acquisition transmissions. Therefore, wireless communications system 100 may benefit from improved beam selection and resource allocation for cell acquisition procedures. That is, implementation of such techniques may result in improved beam-failure recovery, improved resource load balancing, etc. during cell acquisition procedures.

Figure 2:
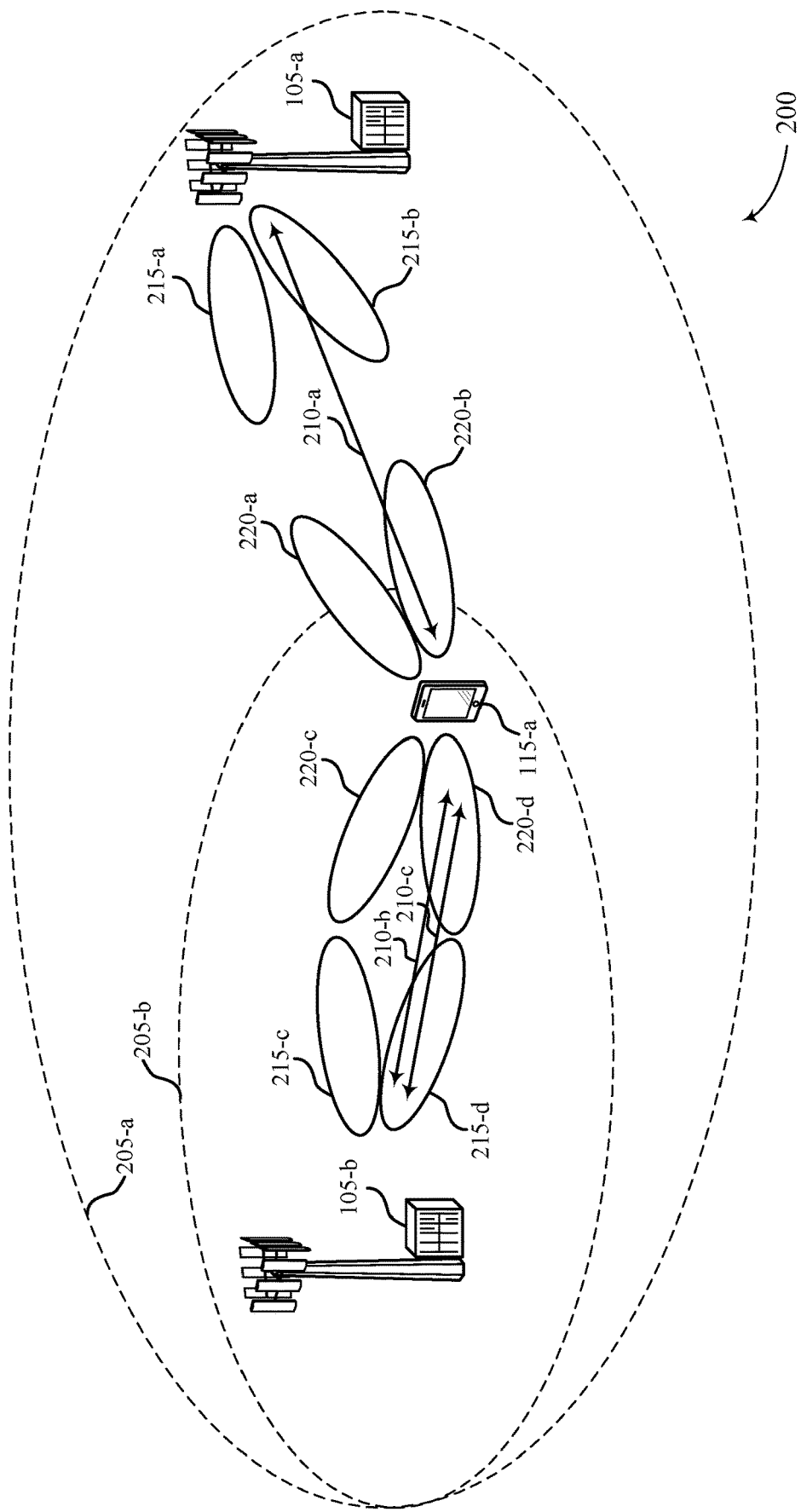
FIG. 2 illustrates an example of a wireless communications system that supports RACH procedures with multiple carriers in accordance with aspects of the present disclosure.

FIG. 2 illustrates an example of a wireless communications system 200 that supports RACH procedures with multiple carriers in accordance with various aspects of the present disclosure. Wireless communications system 200 includes base station 105-*a*, base station 105-*b*, and UE 115-*a*, which may be examples of base stations 105 and UEs 115 as described with reference to FIG. 1. Wireless communications system 200 may illustrate a RACH procedure for enabling UE 115-*a* to access base station 105-*b*, where UE 115-*a* uses multiple transmit beams 220 and multiple CCs 210 for sending RACH transmissions.

In some cases, wireless communications system 200 may support dual connectivity such that UE 115-*a* operates according to a primary cell 205-*a* and a secondary cell 205-*b* for communication with base station 105-*a* and base station 105-*b* respectively. For example, UE 115-*a* may support a connection over primary cell 205-*a* via CC 210-*a* (e.g., a primary CC) and may support a connection over secondary cell 205-*b* via one or more CCs (e.g., secondary CCs) such as CC 210-*b* and CC 210-*c*. To connect over such cells 205, UE 115-*a* may initially perform cell acquisition procedures (e.g., RACH procedures). Such cell acquisition procedures may be performed in a contention-based or contention-free manner. In some cases, contention-free RACH procedures may be performed for secondary cells (e.g., secondary cell 205-*b*) and RAR may be conveyed on a PCell or a PSCell. For example, UE 115-*a* may perform initial cell access procedures to connect with primary cell 205-*a*. Over the connection with primary cell 205-*a*, UE 115-*a* may identify CCs 210 configured for secondary cell 205-*b*. The UE 115-*a* may then perform contention-free RACH procedures for secondary cell acquisition.

According to techniques described herein, wireless communications system 200 may support RAR via multiple CCs for greater scheduling flexibility. Wireless communications system 200 may support flexible CC scheduling for RAR (e.g., not limited to primary CCs), which may, in some cases, consider beam-related aspects such as QCL properties. The network (e.g., wireless communications system 200) may thus send RAR on CCs according to schemes as discussed in more detail below for improved load balancing and increased system performance. As an example, CCs used for RAR may include all CCs configured for both primary cell and secondary cell, QCL CCs (e.g., CCs associated with the same transmit and receive beam direction), or some other subset of all CCs configured for both primary cell and secondary cell.

The base station 105 that sends a handover command causing a UE 115 to perform a cell acquisition procedure (e.g., RACH) may indicate the set of CCs for RAR. In some cases, the set of CCs may be explicitly indicated via a command message (e.g., PDCCH order). For example, a handover command (e.g., a command, from a serving cell, to handover to a neighboring cell) may include the set of CCs over which a RAR from the neighboring cell may be sent. The UE 115 that receives the handover command may then identify over which CCs to monitor for RAR from the neighboring cell when executing the handover (e.g., performing the RACH procedure with the neighboring cell). For example, base station 105-*a* may send a handover command for UE 115-*a* to handover to base station 105-*b*. The handover command may indicate the set of CCs for RAR from base station 105-*b* such that the UE 115-*a* may monitor the set of CCs for RAR following transmission of a RACH message 1 to base station 105-*b* (e.g., triggered by the handover command), to connect to the neighbor cell.

In other examples, base station 105-*a* may transmit a timing-adjust command (e.g., a RACH command, a re-RACH command, etc.) causing a UE 115 to perform a cell acquisition procedure with the base station 105-*a*. In such examples, the RACH command may indicate the set of CCs for RAR from the base station 105-*a*. The UE 115-*a* may receive the command and identify which CCs to monitor for RAR from base station 105-*a* following transmission of the RACH message 1 to base station 105-*a* (e.g., as triggered by the RACH or timing-adjust command), to update UE 115-*a* uplink timing.

In other cases, the set of CCs may be implicitly indicated via physical random access channel (PRACH) resource and/or resources carrying the command message (e.g., downlink control information (DCI) or physical downlink shared channel (PDSCH)). For example, the serving cell may assign PRACH resources for the UE 115 over which the UE 115 may transmit PRACH messages to the neighboring cell (e.g., for handover). The UE 115 may implicitly determine the set of CCs over which the neighboring cell may convey RAR based on the index of the PRACH resource. As another example, the UE 115 may implicitly determine the set of CCs over which the neighboring cell may convey RAR based on the index of the resources carrying the command message (e.g., the index of the PRACH resource and/or resources carrying the command may map to individual CCs or sets of CCs for neighbor cell RAR). Such determination may include the CC associated with the resource, which may be different from the CC associated with the PRACH resource. As such, the UE 115 may monitor the identified CCs (e.g., explicitly or implicitly indicated by the network) during cell acquisition procedures. The term resource may refer to a CC, resource carrying the PDCCH and/or the PDSCH which bears a command, sequence-identifier, time and frequency resources, beam direction, or any combination thereof. In one example, resources may be used to carry PRACH messages, and such resources may include a CC, sequence-identifier, time and frequency resources, beam direction, or a combination thereof. In another example, resources may be used to carry a command message, and such resources may include a CC, a resource carrying the PDCCH and/or the PDSCH which bears the command, time and frequency resources, beam direction, or a combination thereof.

In some cases, the UE 115 may be previously aware (e.g., via network indication) of CCs that are QCL. QCL CCs may refer to CCs for which certain channels are QCL (e.g., QCL channels may be sent via the same beam) and QCL cells may refer to cells for which certain channels are QCL. For example, base station 105-*a* may be configured to utilize QCL antenna ports for transmission of more than one kind of signal, such as synchronization signals, broadcast signals, reference signals, or other signals. Two antenna ports (or two sets of antenna ports) may be quasi co-located with respect to certain properties if those properties of the channel over which a symbol on one antenna port is conveyed can be inferred from the channel over which a symbol on the other antenna port is conveyed. For example, if a measured value for a parameter of the channel for the one antenna port (or set of antenna ports) is within a threshold value of a measured value for the parameter of the channel for the second antenna port (or set of antenna ports), then the two antenna ports (or two sets of antenna ports) are considered to be QCL. Whether antenna ports or sets of antenna ports may be considered to be QCL may in some cases be subject to configuration or pre-configuration by a network operator. That is, if a first signal is transmitted utilizing a first antenna port that is QCL with a second antenna port that is utilized to transmit a second signal, then the first signal and the second signal may be transmitted/received via the same or similar transmit beam and receive beam. Therefore, if two CCs are QCL, they may both be sent via the same beam such that the UE 115 may receive the CCs in a similar manner. QCL CCs may be indicated to the UE 115 via prior signaling using RRC, MAC-CE, DCI, group common DCI, via the handover command, etc. In some examples, there may be multiple groups of QCL CCs (e.g., a group of CCs may associated with one beam and a second group of CCs may be associated with a second beam). Therefore, the network may, in some cases, indicate a QCL group of CCs over which RAR may be conveyed by a neighboring cell. The UE 115 may then form a single beam to receive the one or more CCs (e.g., QCL CCs) of the QCL group associated with expected RAR. In some cases one or more of the CCs that are QCL CCs may have QCL synchronization signals, or QCL CSI-RS, or both.

Additionally, the indication of the set of CCs may also include implicit or explicit activation of CCs. In some examples, the indicated set of CCs may include only activated CCs. However in other examples, if the network indicates the neighboring base station may convey RAR over CCs that are deactivated by the UE 115, the UE 115 may activate the CCs (e.g., the UE 115 may implicitly activate CCs). In other examples if the UE 115 has CCs activated that are not indicated by the network (e.g., for neighboring base station RAR), the UE 115 may, in some cases, deactivate the CCs not indicated (e.g., the UE 115 may implicitly deactivate CCs).

In some cases (e.g., for contention based RACH), message 1 (e.g., RACH message 1 sent by a UE 115 during initial access) of the RACH procedure may indicate a set of CCs on which the UE 115 may receive RAR. Therefore, the network (e.g., the base station 105 receiving the RACH message 1) may separately load balance uplink CCs and downlink CCs. For example, if several UEs transmit RACH message 1 via some uplink CC, the network may balance the downlink CCs (e.g., for RAR) on different downlink CCs for load balancing. The UE 115 may include information in the sequence of the RACH message 1 to indicate the set of CCs on which the UE 115 may receive RAR. For example, there may be 64 possible RACH message 1 sequences which may be partitioned to indicate certain CCs or certain sets of CCs over which the UE 115 may receive subsequent RAR. Additionally or alternatively, time and/or frequency resources used for transmission of the RACH message 1 may indicate certain CCs or certain sets of CCs over which the UE 115 may receive subsequent RAR. As a single example, the frequency resource or CC over which the RACH message 1 was sent may indicate the frequency resource or CC over which the UE 115 may receive RAR. That is, time resources, frequency resource, and/or a sequence index associated with the RACH message 1 may indicate to the network CCs over which the UE 115 may receive RAR. In some cases, the RACH message 1 may indicate cell IDs (e.g., or portions of one or more cell IDs) of other CCs on which the UE 115 has acquired downlink synchronization. UEs 115 may indicate cell IDs whose SS are detected to be QCL with the CC used to carry or convey the RACH message 1. A MIB or remaining minimum system information (RMSI) on one CC may indicate presence of other CCs. In such cases, cell IDs may be signaled more compactly (e.g., via pointers into the set of indicators in the MIB).

In some cases (e.g., in 4-step RACH procedures), RACH message 1 may carry the CC indication in the sequence via resource-space partitioning as discussed above (e.g., partition information may be conveyed in MIB or RMSI in the CC on which the RACH message 1 is sent). In other cases, (e.g., in 2-step RACH procedures), the RACH message 1 may include a payload. In such cases, the payload may carry the CC indication more explicitly, e.g., using some or all bits of a cell-ID, and resource-space partitioning may be reduced or avoided.

Further, RAR CC indications (e.g., UE 115 indications of CC supported for RAR reception) may allow for cross-carrier scheduling of RAR or other subsequent messages. For example, PDCCH of RAR may be in any of the indicated CCs, and may carry self-carrier scheduled PDSCH or cross-carrier scheduled PDSCH for RAR payload. This may result in increased flexibility, as PDCCH and PDSCH may each be conveyed via any of the indicated CCs, and not necessarily both on the same CC. As another example, RAR payload may include resource indications for RACH message 3 (e.g., for 4-step RACH) or RACH message 2 (e.g., for 2-step RACH), which may lie in any of the indicated CCs. That is, the RAR payload may schedule the subsequent UE RACH transmission on one or more of the CCs previously indicated by the UE.

In some cases, wireless communications system 200 may reserve separate resources for RACH-like (e.g., with beam-association to downlink SS) transmission of other signals besides PRACH (e.g., SR, BFRR, etc.). Such resources may be reserved on multiple CCs. RACH resource may consist of a sequence and time and frequency resources (e.g., time-frequency resources) associated with the transmission of the sequence. These time and frequency resources may be associated with a downlink synchronization channel beam direction. The UE 115 may receive synchronization signals on multiple beams from a base station 105, and identify the strongest beam. The UE 115 may then pick the associated resources to transmit SR or BFRR transmissions. As discussed herein, when there are multiple carriers, the UE may also pick the CC associated with the strongest beam for transmission of SR or BFRR.

The SR may be per UE or per cell-group (e.g., in dual-connectivity), or in some cases, common across all CC (e.g., in LTE systems). BFRR may be per CC or common across all CCs. This may be configured when the BFRR resource is configured. Scheduling may be implicit based on cross-carrier QCL indication. CCs may be grouped such that all CCs within the group are QCL. BFRR resources in all CCs within one group may carry indication that the UE 115 had a beam failure for the entire group. With such CC grouping, the UE 115 may monitor for beam-failure on a per group basis (e.g., enough to monitor a subset of CCs per group). SR and BFRR may be UE-autonomous transmissions (e.g., SR may be transmitted when the UE wants to send UL data, and BFRR may be transmitted when the UE wants to tell the base station that it lost the beam or there was a beam failure). The UE may send the SR and/or BFRR on one or more CCs of the set of CCs it is allowed to send them on (e.g., on indicated resources that have been pre-allocated for this purpose). SR and/or BFRR may thus be sent on any one of the indicated CCs.

RLM procedures may be improved via aperiodic in-sync and/or out-of-sync indications. Indications may be in response to beam-failure procedures. In-sync indications may indicate BFRR resulted in successful recovery, while out-of-sync indications may indicate that a beam failed, a need for BFRR transmission, or that the BFRR was unsuccessful. In some cases, these indications may alter the usual operation of a stored timer (e.g., a T310 timer). For example, aperiodic out-of-sync starts (or counts towards starting) the stored timer if it has not already started, or expires or speeds-up expiry if it is already running. In another example, aperiodic in-sync terminates or aborts the timer. RLF may indicate PCell outage (e.g., or PSCell outage for dual-connectivity). The aperiodic indications described above may be based on beam monitoring in any cell in the group of cells that are QCL with PCell/PSCell (e.g., or a subset of these cells, as indicated to the UE by RRC or other configurations).

As discussed herein, RACH procedures may include multiple RACH messages transmitted between the UE and base station to establish network communications. The UE may transmit a first RACH message (e.g., RACH message 1) that includes a RACH preamble, and the base station may transmit a second RACH message (e.g., RACH message 2) that includes a random access response to provide the UE with an uplink resource grant, a timing advance, and a temporary C-RNTI. The UE may then transmit a third RACH message (e.g., RACH message 3) that includes a radio resource control (RRC) connection request. The base station may respond with a fourth RACH message (i.e., RACH message 4) that includes a contention resolution message to proceed with the RRC setup. Such a procedure may refer to a 4-step RACH procedure.

As discussed above, UE 115-*a* may use a RACH transmission when attempting to access a base station 105 (e.g., base station 105-*b*) for network communications. The RACH sequences may be shared by multiple UEs 115 attempting to connect to base station 105-*b*, resulting in a contention-based scenario (e.g., where collisions between the multiple UEs 115 may occur). For the contention-based RACH, UE 115-*a* may first transmit a RACH preamble to the base station after decoding minimum system information, which includes information in MIB and in RMSI (which may be sent over SIBS, such as SIB block 1 (SIB1) and SIB block 2 (SIB2)). This may be known as RACH message 1. For example, the RACH preamble may be randomly selected from a set of 64 predetermined sequences. This may enable the base station to distinguish between the multiple UEs 115 trying to access the system simultaneously.

In some examples, UE 115-*a* may transmit RACH message 1 over a single directional transmit beam or pseudo-omni transmit beam 220 (e.g., a wide beam covering up to 120 degrees). Base station 105-*b* may identify multiple receive beams 215 that receive the RACH message 1 sent via beams 220. The identification of receive beams 215 may be based on the strength of the signal each beam 215 detects (e.g., during a beam sweep process). For example, base station 105-*b* may identify receive beams 215-*c* and receive beam 215-*d* that both receive the RACH message 1 from UE 115-*a*. After identifying the beams, base station 105-*a* may assign a tag or identifier to each receive beam 215.

The base station may respond to RACH message 1 with a RAR, or RACH message 2, that provides an uplink resource grant, a timing advance, and a C-RNTI. Base station 105-*b* may signal the identified beams during RACH message 2 to indicate on which beams UE 115-*a* may transmit RACH message 3. Additionally, RACH message 2 may include a trigger for UE 115-*a* to transmit a beam report (e.g., a beam report for synchronization signals or reference signals received from base station 105-*a*) in RACH message 3. In some cases, base station 105-*b* may further indicate a monitoring configuration within RACH message 2 for UE 115-*a* to utilize for a RACH message 4 (sent by base station 105-*b*). Base station 105-*b* may also request that UE 115-*a* transmit back reports of synchronization signal beams that receive the strongest synchronization signals as part of the RACH message 2 transmission. Alternatively, the beam report may be transmitted at a different time than the RACH message 2.

In some examples, base station 105-*b* may indicate a configuration of the two or more beams 220 used by UE 115-*a* for RACH message 3, including the time/frequency resource for each beam 220. In some cases, base station 105-*b* may signal the indication through a reciprocal QCL relationship for the multiple beams 220 used for transmitting RACH message 3, which may be derived from beams used for receiving synchronization signals from base station 105-*b*. UE 115-*a* may then transmit RACH message 3 utilizing the configured transmit beams 220 in the configured time/frequency resources as discussed above. In some cases, UE 115-*a* may transmit RACH message 3 on the multiple transmit beams 220 over the same time/frequency resource. Additionally or alternatively, base station 105-*b* may configure a multiple beam monitoring pattern in RACH message 2 for UE 115-*a* to receive RACH message 4.

Following receipt of RACH message 3, base station 105-*b* may transmit RACH message 4, which may include an indication to UE 115-*a* to transmit an ACK message. In some cases, the CCs used for RACH message 4 may be selected based on the set of CCs indicated may a RACH message 1 received by the base station 105-*b* (e.g., from the UE 115-*a*). Base station 105-*b* may transmit RACH message 4 on one or more beams with an indication of uplink physical uplink control channel (PUCCH) resources for each beam. The beams may be based on the indication included in RACH message 2 (e.g., transmit beams 215) or may be updated beams based on the beam reports transmitted in RACH message 3. In some examples, a group ACK configuration may be utilized if RACH message 4 is monitored in multiple beams, such that a single ACK may be transmitted for all signals on the multiple beams instead of an ACK for each signal on their respective beam.

Figure 3:
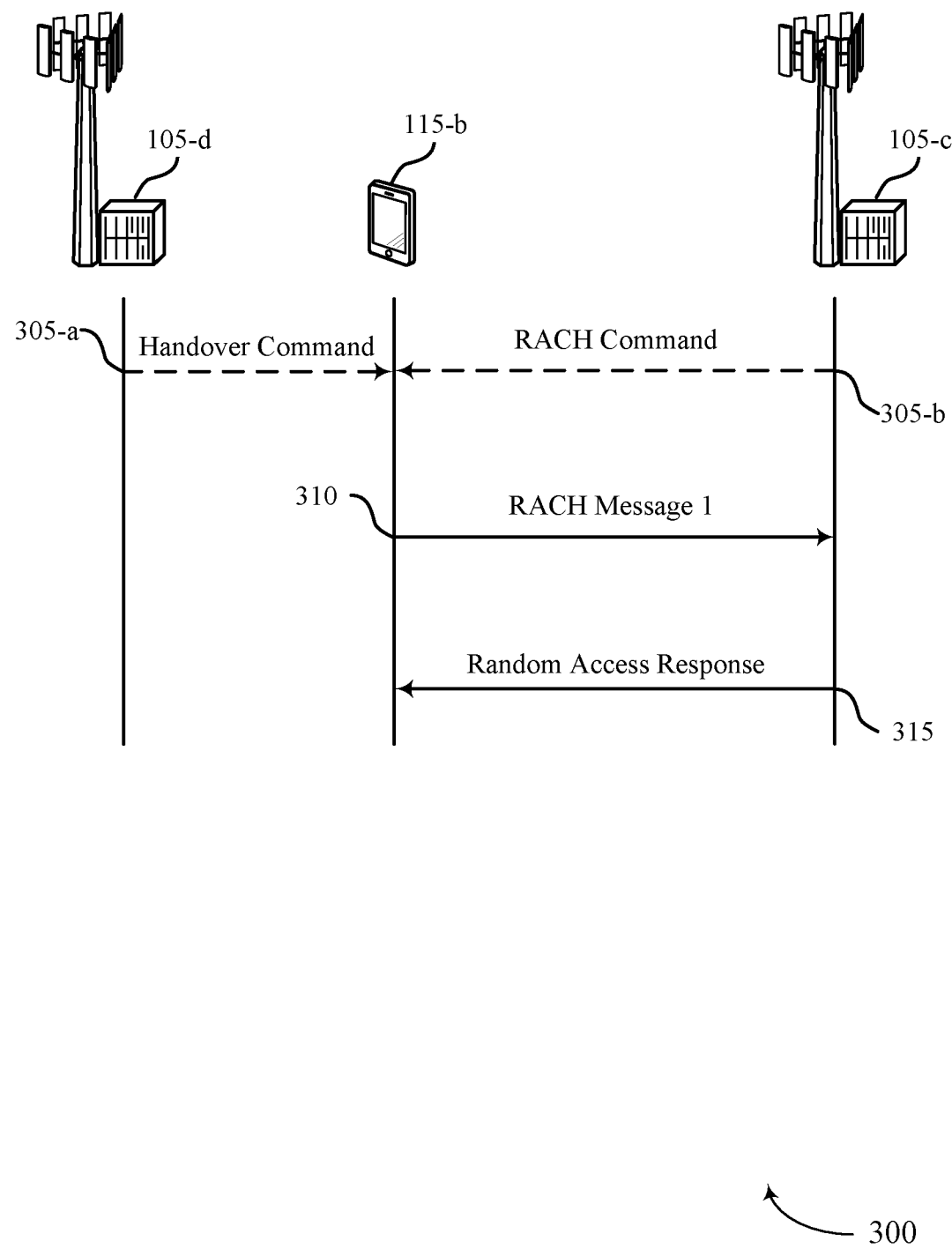
FIGS. 3 through 6 illustrate examples of process flows for RACH procedures with multiple carriers in accordance with aspects of the present disclosure.

FIG. 3 illustrates an example of a process flow 300 for RACH procedures with multiple carriers in accordance with various aspects of the present disclosure. Process flow 300 includes base station 105-*c* and UE 115-*b*, which may be examples of base stations 105 and UEs 115 as described with reference to FIGS. 1 and 2. Process flow 300 may illustrate a RACH procedure for enabling UE 115-*b* to access base station 105-*c*, where UE 115-*b* uses multiple transmit beams and multiple CCs for sending RACH transmissions.

In the following description of the process flow 300, the operations between the UE 115-*b* and the base station 105-*c* may be transmitted in a different order than the exemplary order shown, or the operations performed by UE 115-*b* and the base station 105-*c* may be performed in different orders or at different times. Certain operations may also be left out of the process flow 300, or other operations may be added to the process flow 300.

At 305-*a*, base station 105-*d* may transmit an indication of a set of CCs for UE 115-*b* to use to receive a response to a first RACH transmission from a neighbor base station 105-*c* (e.g., a set of CCs for UE 115-*b* to use to receive a subsequent RAR). In such cases, the indication may be included in a handover command (e.g., in a handover command from base station 105-*d*, for the UE 115-*b* to RACH to base station 105-*c*). In some cases, the handover command may include indicators for each respective CC of the set of CCs. In some cases, a resource (e.g., a CC, a resource carrying a PDCCH bearing the command, a resource carrying a PDSCH bearing the command, etc.) used to carry the handover command may be identified, and the indication of the set of CCs may be based on the identified resource. In other cases, receiving the indication of the set of CCs may include receiving an allocation of PRACH resources (e.g., a CC, a sequence identifier, a time-frequency resource, a beam direction, etc.) for the UE 115-*b* to use to transmit RACH transmissions (e.g., RACH message 1, etc.). In such cases, the UE 115-*b* may identify the set of CCs based on the allocated PRACH resources. In yet other cases, receiving the indication of the set of CCs may include receiving the indication in a RRC message, a MAC control element (CE), a DCI, a group-common DCI, a handover command, etc. In some examples, the set of indicated CCs may include QCL CCs, a set of activated CCs (e.g., active CCs of the UE 115-*b*), or a set of CCs selected according to some other criteria.

In other cases (e.g., at 305-*b*), the base station 105-*c* may transmit an indication of a set of CCs for UE 115-*b* to use to receive a response to a first RACH transmission from the base station 105-*c* (e.g., a set of CCs for UE 115-*b* to use to receive a subsequent RAR). In such cases, the indication may be included in a RACH command (e.g., timing-adjust command, re-RACH command, a command to transmit a RACH transmission, etc. from base station 105-*c*, for the UE 115-*b* to RACH to base station 105-*c*). The RACH command may include indicators for each respective CC of the set of CCs. In some cases, a resource (e.g., a CC, a resource carrying a PDCCH bearing the command, a resource carrying a PDSCH bearing the command, etc.) used to carry the RACH command may be identified, and the indication of the set of CCs may be based on the identified resource. In other cases, receiving the indication of the set of CCs may include receiving an allocation of PRACH resources (e.g., a CC, a sequence identifier, a time-frequency resource, a beam direction, etc.) for the UE 115-*b* to use to transmit RACH transmissions (e.g., RACH message 1, etc.). In such cases, the UE 115-*b* may identify the set of CCs based on the allocated PRACH resources. In yet other cases, receiving the indication of the set of CCs may include receiving the indication in a RRC message, a MAC CE, a DCI, a group-common DCI, a handover command, etc. In some examples, the set of indicated CCs may include QCL CCs, a set of activated CCs (e.g., active CCs of the UE 115-*b*), or a set of CCs selected according to some other criteria.

At 310, UE 115-*b* may transmit a first RACH transmission (e.g., a RACH message 1, a random access request, a RACH preamble, etc.) to base station 105-*c*. In some cases, the first RACH transmission may be sent in response to a handover command.

At 315, base station 105-*c* may transmit a response (e.g., a RAR, RACH message 2, etc.) to the RACH message 1 received at 310 using one or more of the set of CCs indicated at 305. Further, UE 115-*b* may monitor for the response over the set of CCs indicated by the indication received at 305, and may receive the response over the one or more CCs of the set of CCs used for transmission of the response.

Figure 4:
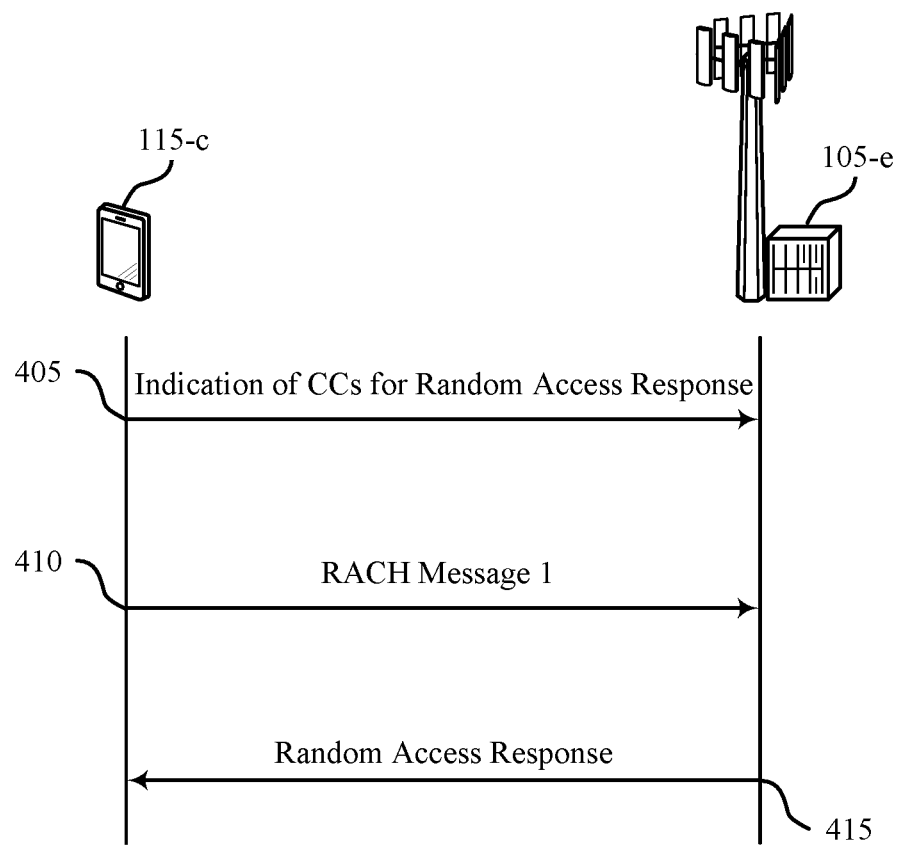

FIG. 4 illustrates an example of a process flow 400 for RACH procedures with multiple carriers in accordance with various aspects of the present disclosure. Process flow 400 includes base station 105-*e* and UE 115-*c*, which may be examples of base stations 105 and UEs 115 as described with reference to FIGS. 1 and 2. Process flow 400 may illustrate a RACH procedure for enabling UE 115-*c* to access base station 105-*e*, where UE 115-*c* uses multiple transmit beams and multiple CCs for sending RACH transmissions.

In the following description of the process flow 400, the operations between the UE 115-*c* and the base station 105-*e* may be transmitted in a different order than the exemplary order shown, or the operations performed by UE 115-*c* and the base station 105-*e* may be performed in different orders or at different times. Certain operations may also be left out of the process flow 400, or other operations may be added to the process flow 400.

At 405, UE 115-*c* may transmit an indication of a set of CCs that UE 115-*c* may use to receive a response to a RACH transmission from base station 105-*e*. In some cases, the UE 115-*c* may have previously identified one or more cells with which the UE 115-*c* has acquired downlink synchronization. In such cases, the indication of the set of CCs may include a cell identifier for each respective cell of the one or more cells. Additionally or alternatively, the UE 115-*c* may have received a system information transmission on a certain CC, and the system information transmission may include an indication of the set of CCs.

At 410, UE 115-*c* may transmit a first RACH transmission to the base station 105-*e*. In some cases, as discussed in detail above, the first RACH transmission (e.g., the RACH message 1) may include the indication of 405.

At 415, base station 105-*e* may transmit a RACH response (e.g., transmit a RACH response to the RACH transmission of 410), using one or more CCs of the set of CCs indicated at 405, to the UE 115-*c*. In some cases, UE 115-*c* may identify a CC index for a third RACH transmission based on the RACH response (e.g., RAR) received at 410. In such cases, the third RACH transmission may refer to a third message of a 4-step RACH procedure, or an acknowledgment message of a 2-step RACH procedure. In some examples the UE 115-*c* may receive a control channel transmission (e.g., PDCCH) of the RAR and the UE 115-*c* may identify, based on the received PDCCH, a CC of the indicated set of CCs that carries a data channel (e.g., PDSCH) of the RAR. The CC may or may not be the same for the control channel and the data channel.

Figure 5:
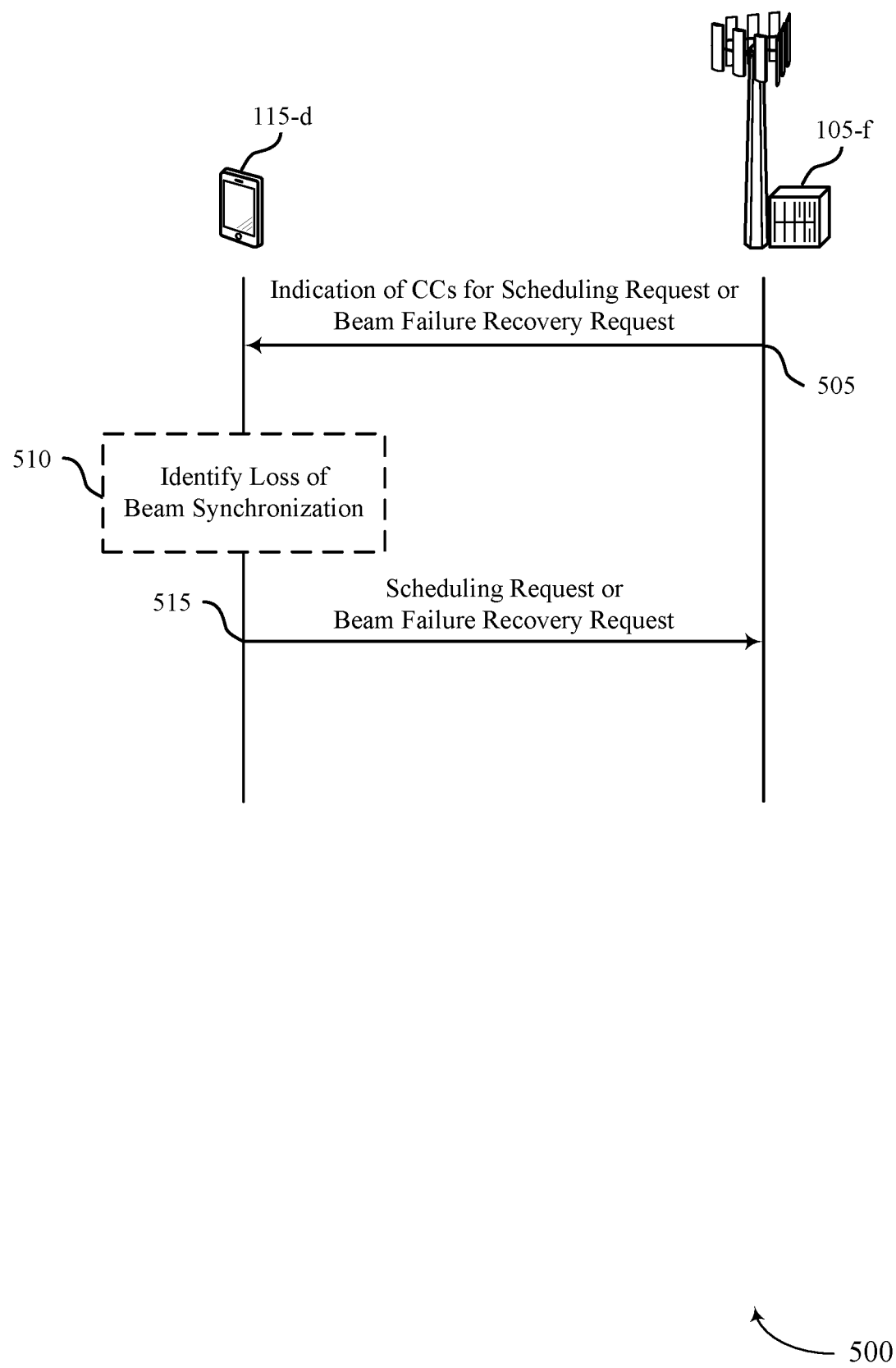

FIG. 5 illustrates an example of a process flow 500 for RACH procedures with multiple carriers in accordance with various aspects of the present disclosure. Process flow 500 includes base station 105-*f* and UE 115-*d*, which may be examples of base stations 105 and UEs 115 as described with reference to FIGS. 1 and 2. Process flow 500 may illustrate a RACH procedure for enabling UE 115-*d* to access base station 105-*f*, where UE 115-*d* uses multiple transmit beams and/or multiple CCs for sending SR and/or BFRR transmissions.

At 505, base station 105-*f* may transmit, to UE 115-*d*, an indication of a set of CCs that the UE 115-*d* may use to transmit SRs or BFRRs to base station 105-*f*. In some cases, the indication of the set of CCs reserves the set of CCs for the UE 115-*d* to use to transmit SRs or BFRRs to the base station 105-*f*.

Further, the UE 115-*d* may monitor for beam failure of some (e.g., at least one) CC of the set of CCs. At 510, UE 115-*d* may, in some cases, identify a loss of beam synchronization (e.g., for a single CC of the set of CCs).

In cases where the UE 115-*d* identified a loss of beam synchronization, the UE 115-*d* may transmit a BFRR at 515 (e.g., for the single CC or for the set of CCs). The BFRR may be transmitted via one or more CCs of the set of CCs indicated at 505. Additionally or alternatively, the UE 115-*d* may autonomously transmit SR at 515, via one or more CCs of the CCs indicated at 505.

Figure 6:
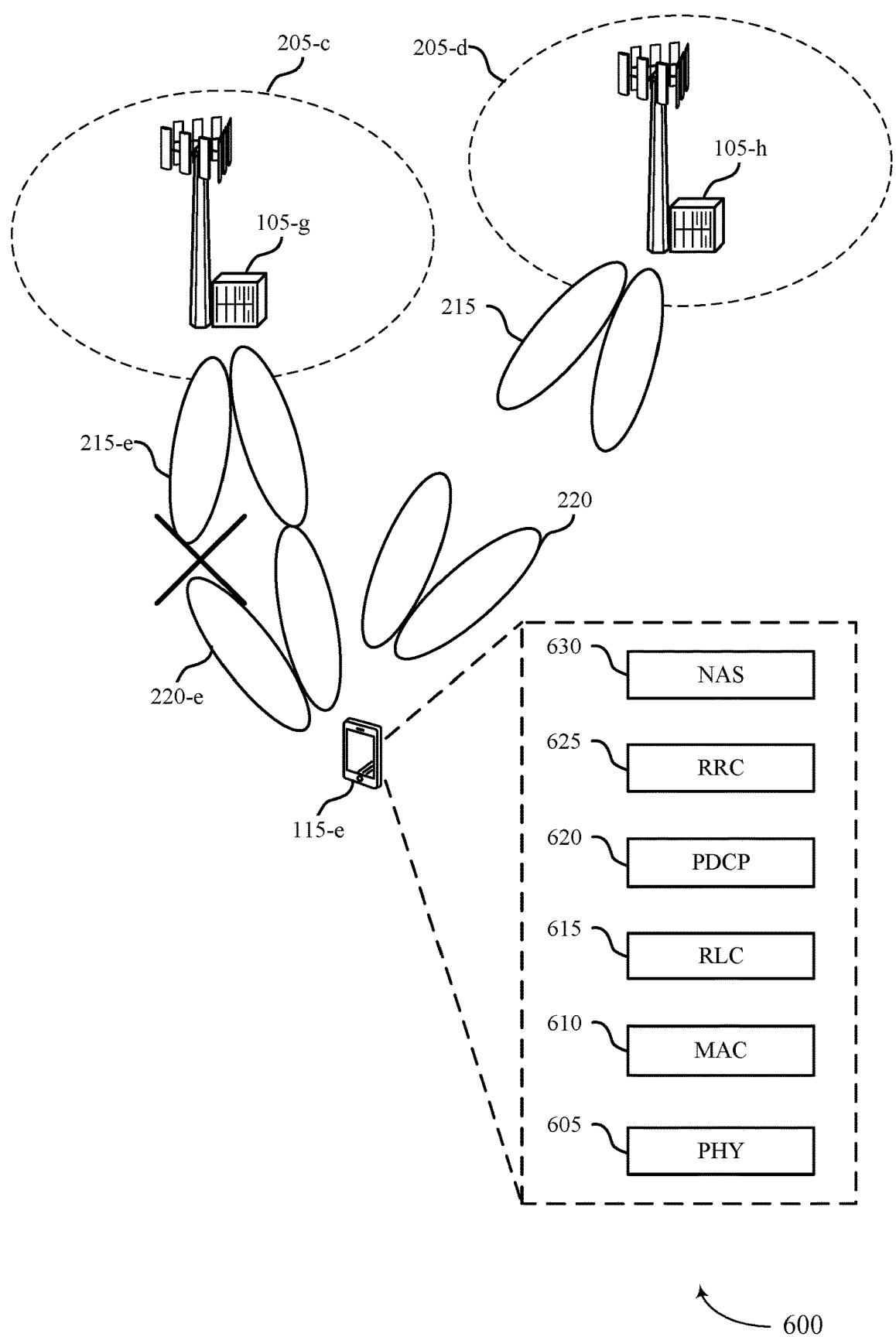

FIG. 6 illustrates an example of a wireless communications system 600 that supports RACH procedures with multiple carriers in accordance with various aspects of the present disclosure. Wireless communications system 600 includes base station 105-*g*, base station 105-*h*, and UE 115-*e*, which may be examples of base stations 105 and UEs 115 as described with reference to FIGS. 1 and 2. Wireless communications system 200 may illustrate RLM procedure performed by UE 115-*e*. UE 115-*e* may utilize a PHY layer 605, a MAC layer 610, a RLC layer 615, a PDCP layer 620, a RRC layer 625, and a NAS layer 630. UE 115-*e* may also use an application or software layer (not shown). Such layers are included for exemplary purposes only. Other layers or arrangements of layers may implement techniques described herein by analogy without departing from the scope of the present disclosure.

UE 115-*e* may monitor multiple cells (e.g., cell 205-*c* and cell 205-*d*) for beam failure. In some cases, the monitored cells may be QCL with a primary cell (e.g., PCell) serving UE 115-*e* or a primary secondary cell (e.g., PSCell) serving the UE 115-*e*. UE 115-*e* may identify a beam failure for one of the multiple serving cells 205. In such cases, the UE 115-*e* may perform a RLM procedure based on the identified beam failure. The RLM procedure may include sending an indication of the identified beam failure from a physical layer (e.g., PHY layer 605) to an upper layer (e.g., RRC layer 625, or an application layer), for example through one or more of the other layers (e.g., PDCP layer 620).

For example, UE 115-*e* may monitor cell 205-*c* using a receive beam 220-*e*. UE 115-*e* may identify that beam failure has occurred (e.g., beam 220-*e* and beam 215-*e* may have become misaligned). The UE 115-*e* may perform an RLM procedure (e.g., send a beam failure indication or a RLF indication up the layers of UE 115-*e* such that the RLM procedure may be executed) to reestablish a connection or link with cell 205-*c*.

Figure 7:
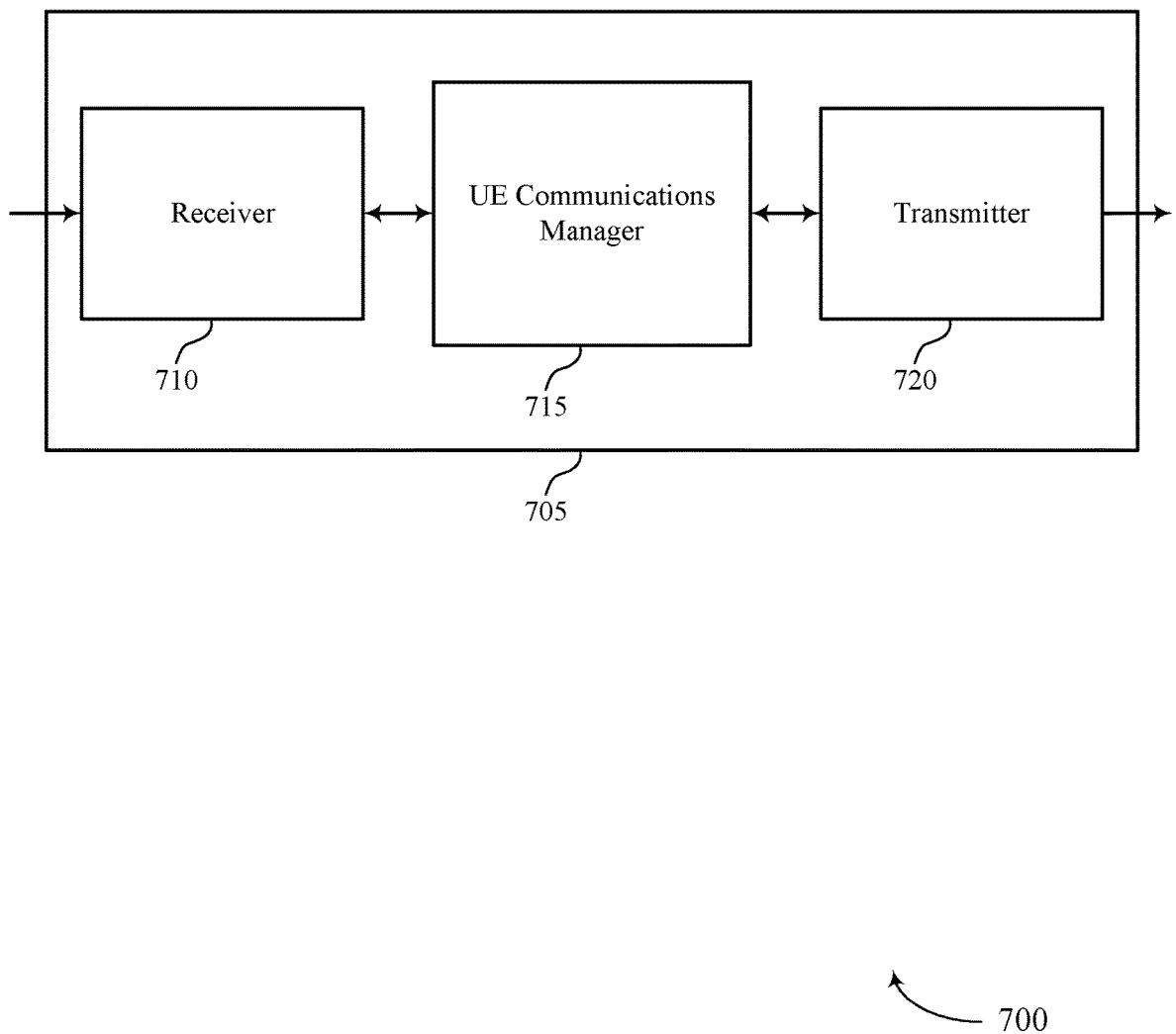
FIGS. 7 through 9 show block diagrams of a device that supports RACH procedures with multiple carriers in accordance with aspects of the present disclosure.

FIG. 7 shows a block diagram 700 of a wireless device 705 that supports random access channel (RACH) procedures with multiple carriers in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to RACH procedures with multiple carriers, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a first base station, an indication of a set of component carriers for the UE to use to receive, from a second base station, a response to a first RACH transmission, transmit the first RACH transmission to the second base station, and receive, using one or more of the set of component carriers, the second RACH transmission responsive to the first RACH transmission. The UE communications manager 715 may also transmit an indication of a set of component carriers that the UE can use to receive a response to a RACH transmission to a base station, transmit a first RACH transmission to the base station, and receive, using one or more of the set of component carriers, a second RACH transmission in response to the first RACH transmission. The indication may further indicate a maximum number of component carriers on which the UE takes measurements. The UE communications manager 715 may also receive, from a base station, an indication of a set of component carriers that the UE can use to transmit scheduling requests or beam-failure recovery requests to a base station and transmit, based on the received indication and using one or more component carriers of the indicated set of component carriers, a scheduling request or a beam-failure recovery request to the base station. The UE communications manager 715 may also monitor one or more of a set of cells serving a UE for beam failure, the one or more cells quasi co-located with a PCell serving the UE or a PSCell serving the UE, identify a beam failure for at least one of the one or more cells serving the UE, and perform a radio link management procedure based on the identified beam failure.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
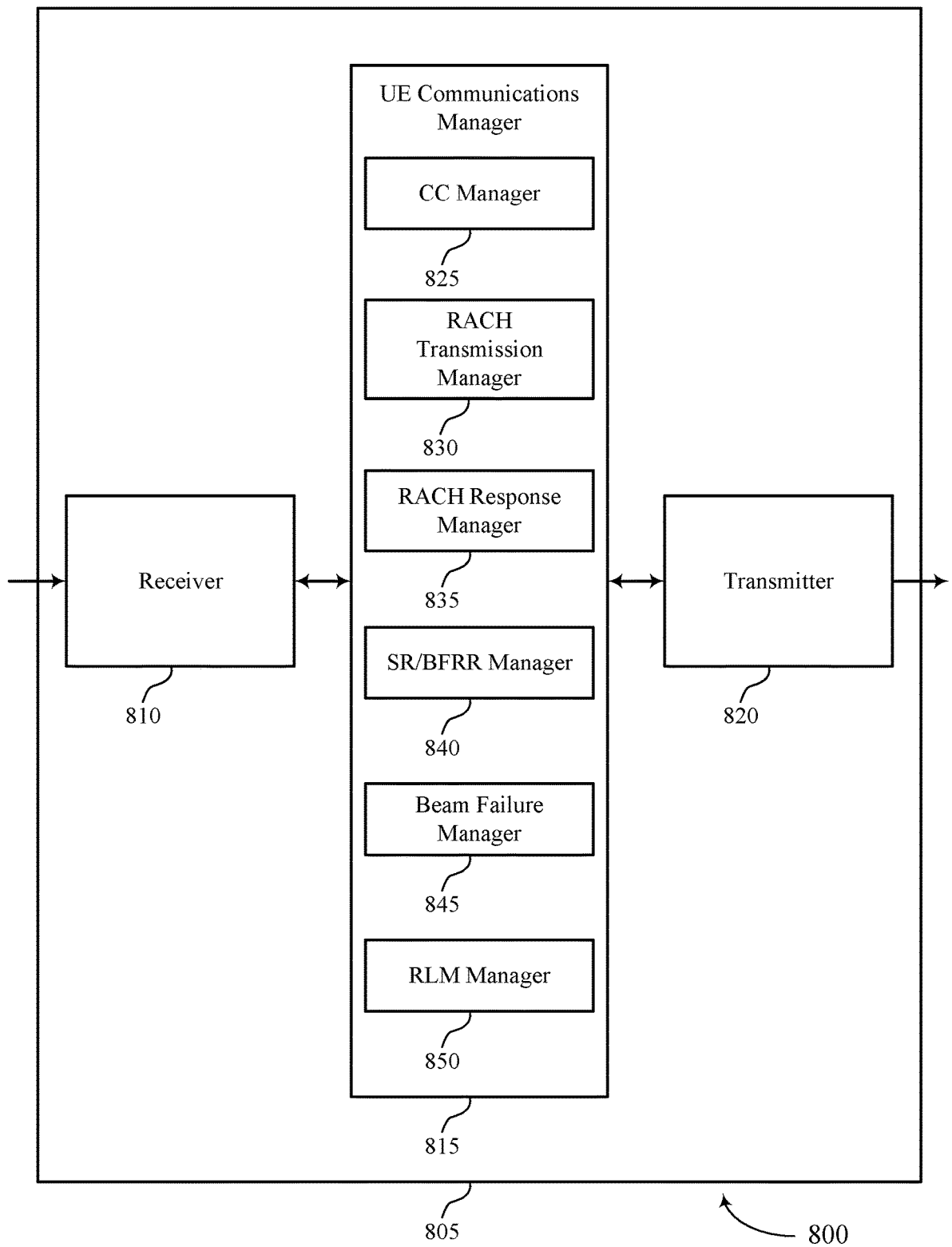

FIG. 8 shows a block diagram 800 of a wireless device 805 that supports RACH procedures with multiple carriers in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to RACH procedures with multiple carriers, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10.

UE communications manager 815 may also include CC manager 825, RACH transmission manager 830, RACH response manager 835, SR/BFRR manager 840, beam failure manager 845, and RLM manager 850.

CC manager 825 may receive, from a first base station, an indication of a set of component carriers for the UE to use to receive, from a second base station, a response to a first RACH transmission, identify the indication of the set of component carriers based on the command, identify the set of component carriers based on the PRACH resources, identify that the set of component carriers includes activated component carriers based on the received indication of the set of component carriers, transmit an indication of a set of component carriers that the UE can use to receive a response to a RACH transmission to a base station, receive a system information transmission on a first component carrier, where the system information transmission includes the indication of the set of component carriers, and receive, from a base station, an indication of a set of component carriers that the UE can use to transmit scheduling requests or beam-failure recovery requests to a base station. The indication may further indicate a maximum number of component carriers on which the UE takes measurements. In some cases, the indication of the set of component carriers reserves the set of component carriers for the UE to use to transmit scheduling requests or beam-failure recovery requests to a base station. In some cases, the first base station and the second base station are different base stations. In some cases, receiving the indication of the set of component carriers includes: receiving a command from the first base station, where the first RACH transmission is transmitted based on the received command. In some cases, the command includes a handover command or a command to transmit a RACH transmission. In some cases, identifying the indication of the set of component carriers based on the command includes: identifying, in the command, indicators for each respective component carrier of the set of component carriers. In some cases, identifying the indication of the set of component carriers based on the command includes: identifying a resource used to carry the command, where the indication of the set of component carriers is based on the identified resource. In some cases, the identified resource includes a component carrier, or a resource carrying a physical downlink control channel (PDCCH) bearing the command, or a resource carrying a physical downlink shared channel (PDSCH) bearing the command, or a combination thereof. In some cases, receiving the indication of the set of component carriers includes: receiving an allocation of physical random access channel (PRACH) resources for the UE to use to transmit RACH transmissions. In some cases, the first base station and the second base station are a same base station. In some cases, receiving the indication of the set of component carriers includes: receiving the indication in a radio resource control (RRC) message, or a media access control (MAC) CE, or a downlink control information (DCI), or a group-common DCI, or a handover command, or a combination thereof. In some cases, the set of component carriers are quasi co-located component carriers. In some cases, the indication of the set of component carriers identifies the component carriers within a previously configured subset of component carriers. In some cases, the subset of component carriers include quasi co-located component carriers. In some cases, the indication of the set of component carriers is transmitted as part of the first RACH transmission. In some cases, the PRACH resources include a component carrier, or a sequence identifier, or a time-frequency resource, or a beam direction, or a combination thereof.

RACH transmission manager 830 may transmit the first RACH transmission to the second base station and transmit a first RACH transmission to the base station. In some cases, the first RACH transmission includes a random access preamble.

RACH response manager 835 may receive, using one or more of the set of component carriers, the second RACH transmission responsive to the first RACH transmission, receive, using one or more of the set of component carriers, a second RACH transmission in response to the first RACH transmission, and identify, based on the received second RACH transmission, a component carrier index for a third RACH transmission. In some cases, the second RACH transmission includes a random access response. In some cases, the third RACH transmission includes a third message of a four-step RACH procedure, or an acknowledgement message of a two-step RACH procedure.

SR/BFRR manager 840 may transmit, based on the received indication and using one or more component carriers of the indicated set of component carriers, a scheduling request or a beam-failure recovery request to the base station, transmit the beam-failure recovery request for the single component carrier, and transmit the beam-failure recovery request for the set of component carriers. In some cases, transmitting the beam-failure recovery request to the base station includes: identifying loss of beam synchronization for a single component carrier of the set of component carriers. In some cases, transmitting the beam-failure recovery request to the base station includes: identifying loss of beam synchronization for a single component carrier of the set of component carriers.

Beam failure manager 845 may monitor for beam failure of at least one component carrier for each group of component carriers of the set of component carriers, monitor one or more of a set of cells serving a UE for beam failure, the one or more cells quasi co-located with a PCell serving the UE or a PSCell serving the UE, identify a beam failure for at least one of the one or more cells serving the UE, and send an indication of the identified beam failure from a physical layer of the wireless device to an upper layer of the wireless device.

RLM manager 850 may perform a radio link management procedure based on the identified beam failure.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
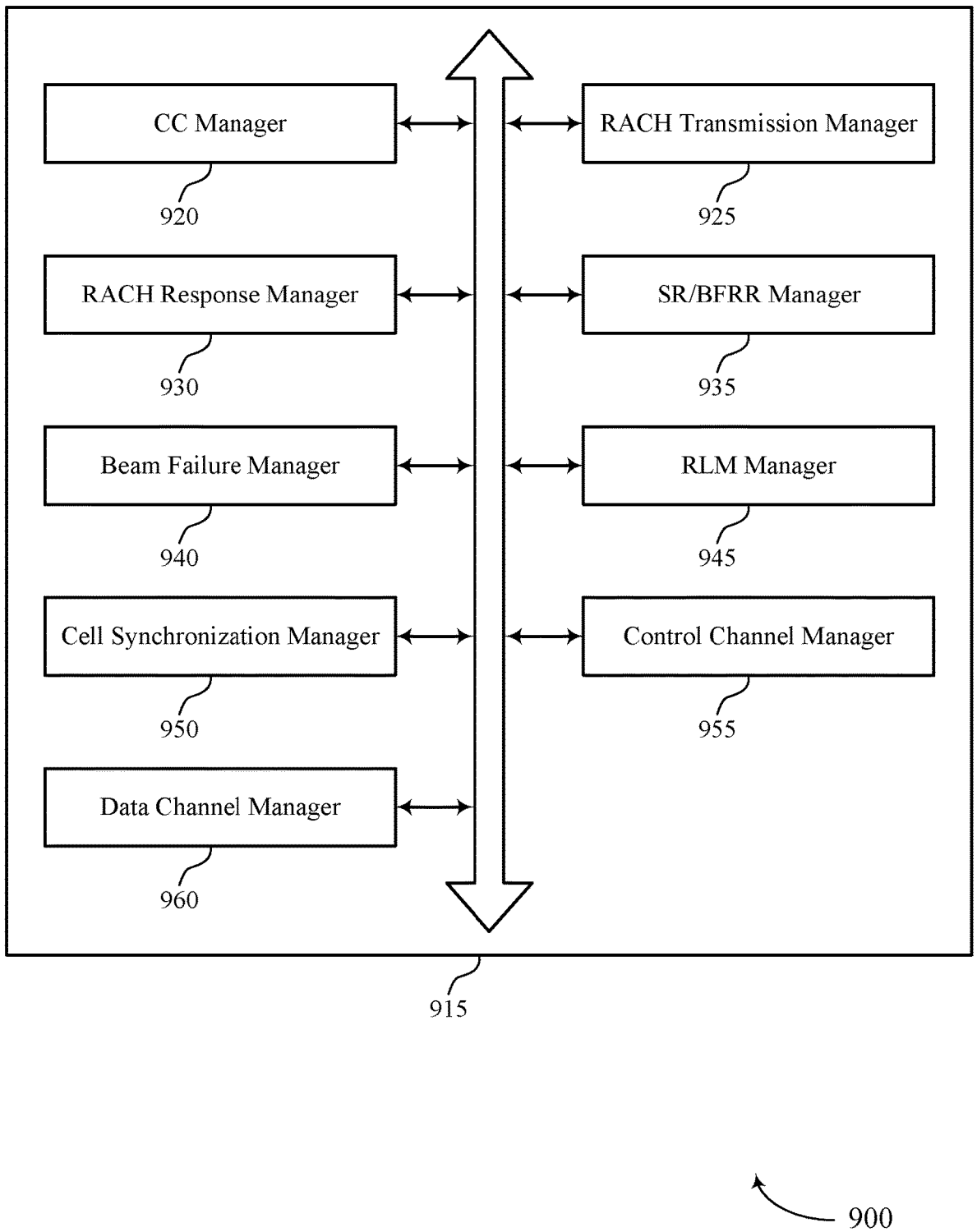

FIG. 9 shows a block diagram 900 of a UE communications manager 915 that supports RACH procedures with multiple carriers in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include CC manager 920, RACH transmission manager 925, RACH response manager 930, SR/BFRR manager 935, beam failure manager 940, RLM manager 945, cell synchronization manager 950, control channel manager 955, and data channel manager 960. Each of these modules may communicate, directly or indirectly, with one another (e.g., via one or more buses).

CC manager 920 may receive, from a first base station, an indication of a set of component carriers for the UE to use to receive, from a second base station, a response to a first RACH transmission, identify the indication of the set of component carriers based on the command, identify the set of component carriers based on the PRACH resources, identify that the set of component carriers includes activated component carriers based on the received indication of the set of component carriers, transmit an indication of a set of component carriers that the UE can use to receive a response to a RACH transmission to a base station, receive a system information transmission on a first component carrier, where the system information transmission includes the indication of the set of component carriers, and receive, from a base station, an indication of a set of component carriers that the UE can use to transmit scheduling requests or beam-failure recovery requests to a base station. The indication may further indicate a maximum number of component carriers on which the UE takes measurements. In some cases, the indication of the set of component carriers reserves the set of component carriers for the UE to use to transmit scheduling requests or beam-failure recovery requests to a base station. In some cases, the first base station and the second base station are different base stations. In some cases, receiving the indication of the set of component carriers includes: receiving a command from the first base station, where the first RACH transmission is transmitted based on the received command. In some cases, the command includes a handover command or a command to transmit a RACH transmission. In some cases, identifying the indication of the set of component carriers based on the command includes: identifying, in the command, indicators for each respective component carrier of the set of component carriers. In some cases, identifying the indication of the set of component carriers based on the command includes: identifying a resource used to carry the command, where the indication of the set of component carriers is based on the identified resource. In some cases, the identified resource includes a component carrier, or a resource carrying a PDCCH bearing the command, or a resource carrying a PDSCH bearing the command, or a combination thereof. In some cases, receiving the indication of the set of component carriers includes: receiving an allocation of physical random access channel (PRACH) resources for the UE to use to transmit RACH transmissions. In some cases, the first base station and the second base station are a same base station. In some cases, receiving the indication of the set of component carriers includes: receiving the indication in a RRC message, or a MAC CE, or a DCI, or a group-common DCI, or a handover command, or a combination thereof. In some cases, the set of component carriers are quasi co-located component carriers. In some cases, the indication of the set of component carriers identifies the component carriers within a previously configured subset of component carriers. In some cases, the subset of component carriers include quasi co-located component carriers. In some cases, the indication of the set of component carriers is transmitted as part of the first RACH transmission. In some cases, the PRACH resources include a component carrier, or a sequence identifier, or a time-frequency resource, or a beam direction, or a combination thereof.

RACH transmission manager 925 may transmit the first RACH transmission to the second base station and transmit a first RACH transmission to the base station. In some cases, the first RACH transmission includes a random access preamble.

RACH response manager 930 may receive, using one or more of the set of component carriers, the second RACH transmission responsive to the first RACH transmission, receive, using one or more of the set of component carriers, a second RACH transmission in response to the first RACH transmission, and identify, based on the received second RACH transmission, a component carrier index for a third RACH transmission. In some cases, the second RACH transmission includes a random access response. In some cases, the third RACH transmission includes a third message of a four-step RACH procedure, or an acknowledgement message of a two-step RACH procedure.

SR/BFRR manager 935 may transmit, based on the received indication and using one or more component carriers of the indicated set of component carriers, a scheduling request or a beam-failure recovery request to the base station, transmit the beam-failure recovery request for the single component carrier, and transmit the beam-failure recovery request for the set of component carriers. In some cases, transmitting the beam-failure recovery request to the base station includes: identifying loss of beam synchronization for a single component carrier of the set of component carriers. In some cases, transmitting the beam-failure recovery request to the base station includes: identifying loss of beam synchronization for a single component carrier of the set of component carriers.

Beam failure manager 940 may monitor for beam failure of at least one component carrier for each group of component carriers of the set of component carriers, monitor one or more of a set of cells serving a UE for beam failure, the one or more cells quasi co-located with a PCell serving the UE or a PSCell serving the UE, identify a beam failure for at least one of the one or more cells serving the UE, and send an indication of the identified beam failure from a physical layer of the wireless device to an upper layer of the wireless device.

RLM manager 945 may perform a radio link management procedure based on the identified beam failure.

Cell synchronization manager 950 may identify one or more cells with whom the UE has acquired downlink synchronization, where the indication of the set of component carriers includes a cell identifier for each respective cell of the one or more cells.

Control channel manager 955 may receive a PDCCH of the second RACH transmission.

Data channel manager 960 may identify, based on the received PDCCH, a first component carrier of the indicated set of component carriers that carries a PDSCH of the second RACH transmission. In some cases, the first component carrier of the indicated set of component carriers carries the PDCCH and the PDSCH. In some cases, a second component carrier of the indicated set of component carriers carries the PDCCH, the second component carrier being a different component carrier than the first component carrier.

Figure 10:
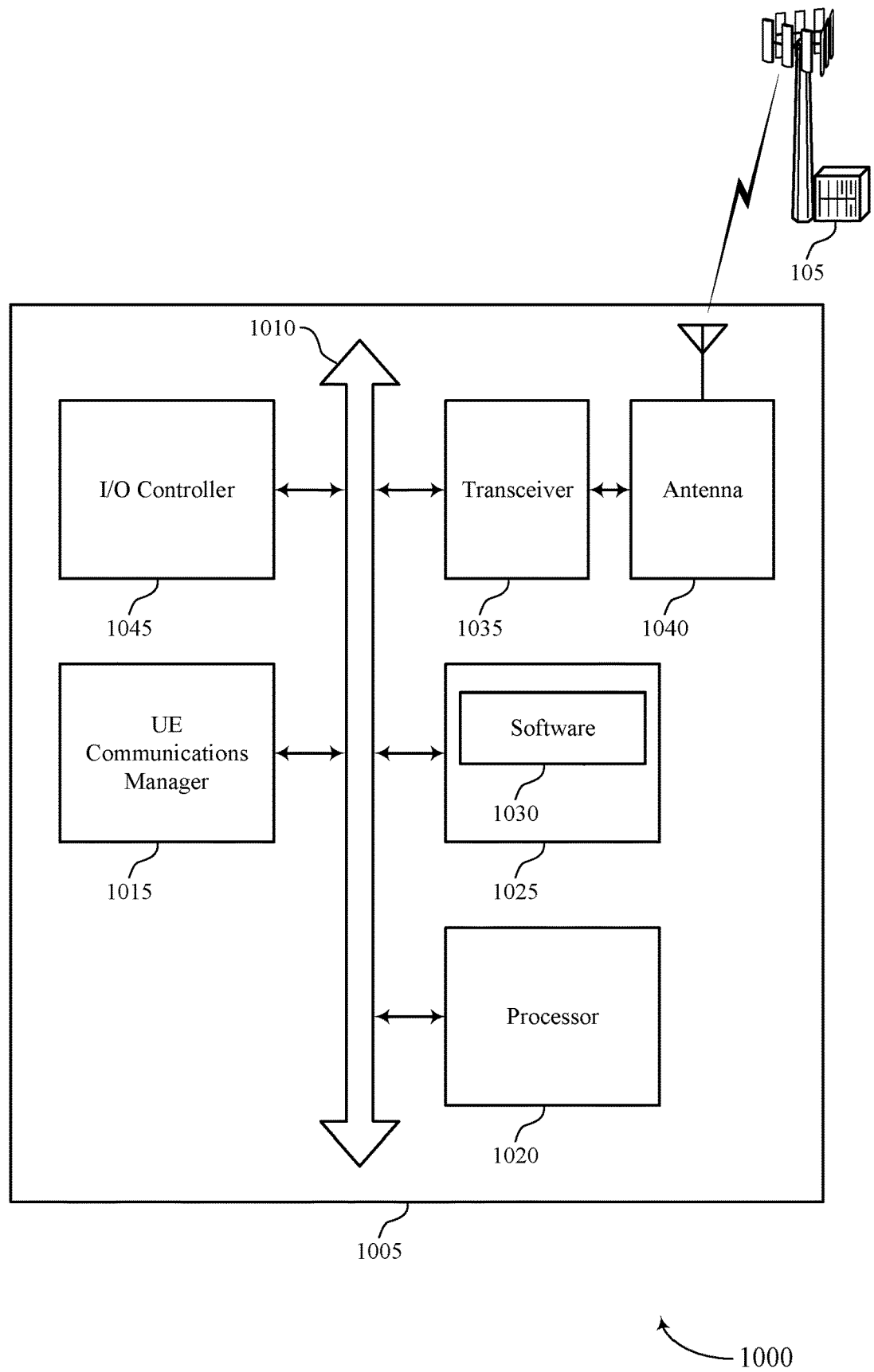
FIG. 10 illustrates a block diagram of a system including a UE that supports RACH procedures with multiple carriers in accordance with aspects of the present disclosure.

FIG. 10 shows a diagram of a system 1000 including a device 1005 that supports RACH procedures with multiple carriers in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting RACH procedures with multiple carriers).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support RACH procedures with multiple carriers. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
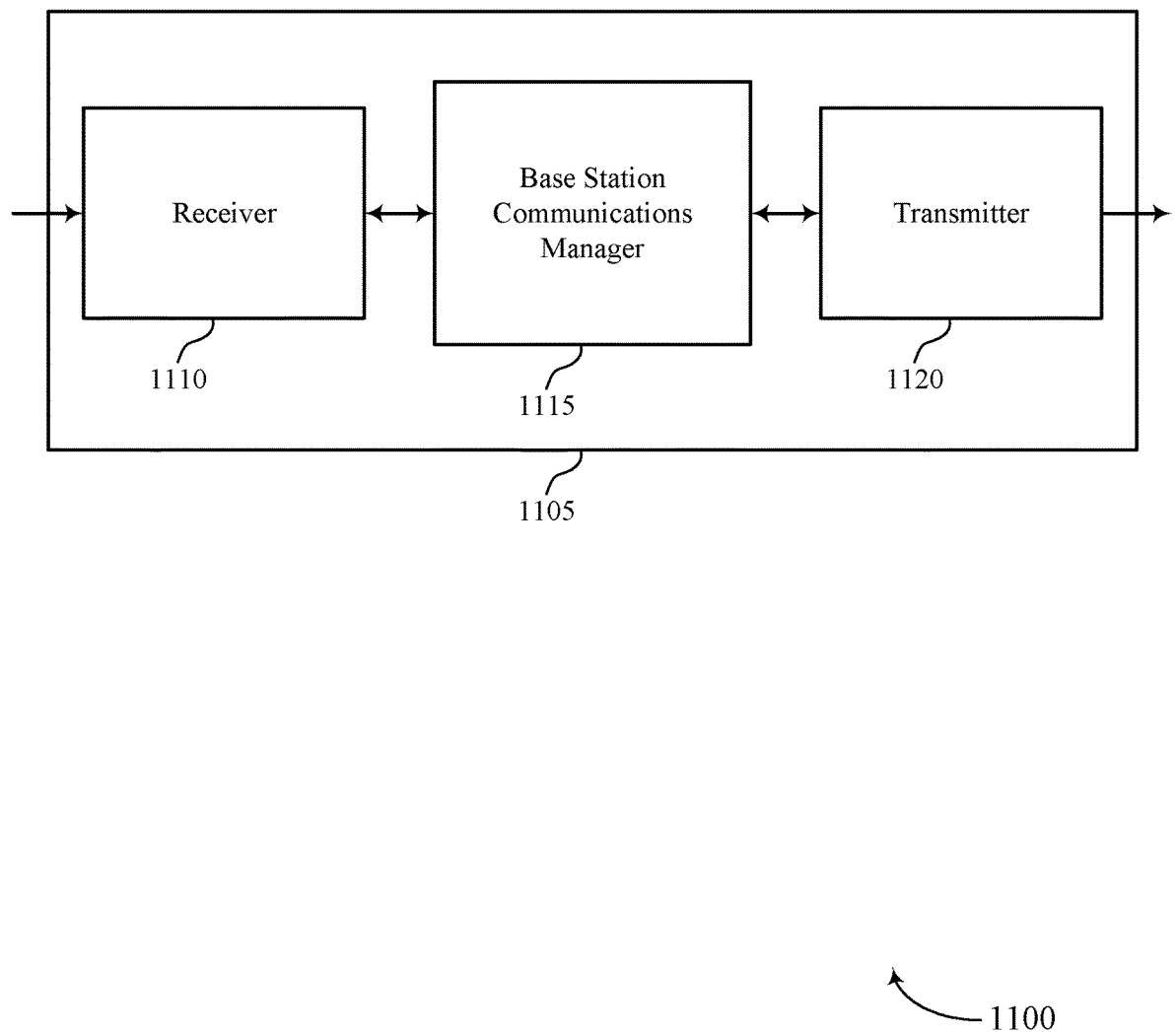
FIGS. 11 through 13 show block diagrams of a device that supports RACH procedures with multiple carriers in accordance with aspects of the present disclosure.

FIG. 11 shows a block diagram 1100 of a wireless device 1105 that supports RACH procedures with multiple carriers in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to RACH procedures with multiple carriers, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit an indication of a set of component carriers for a UE to use to receive, from a second base station, a response to a first RACH transmission, receive the first RACH transmission from the UE, and transmit, using one or more of the set of component carriers, a second RACH transmission in response to the received first RACH transmission. The base station communications manager 1115 may also receive, from a UE an indication of a set of component carriers that the UE can use to receive a response to a RACH transmission from the base station, receive a first RACH transmission from the UE, and transmit, to the UE using one or more of the set of component carriers, a second RACH transmission in response to the first RACH transmission. The base station communications manager 1115 may also transmit, to a UE, an indication of a set of component carriers that the UE can use to transmit scheduling requests or beam-failure recovery requests to the base station and receive, based on the transmitted indication and using one or more component carriers of the indicated set of component carriers, a scheduling request or a beam-failure recovery request from the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
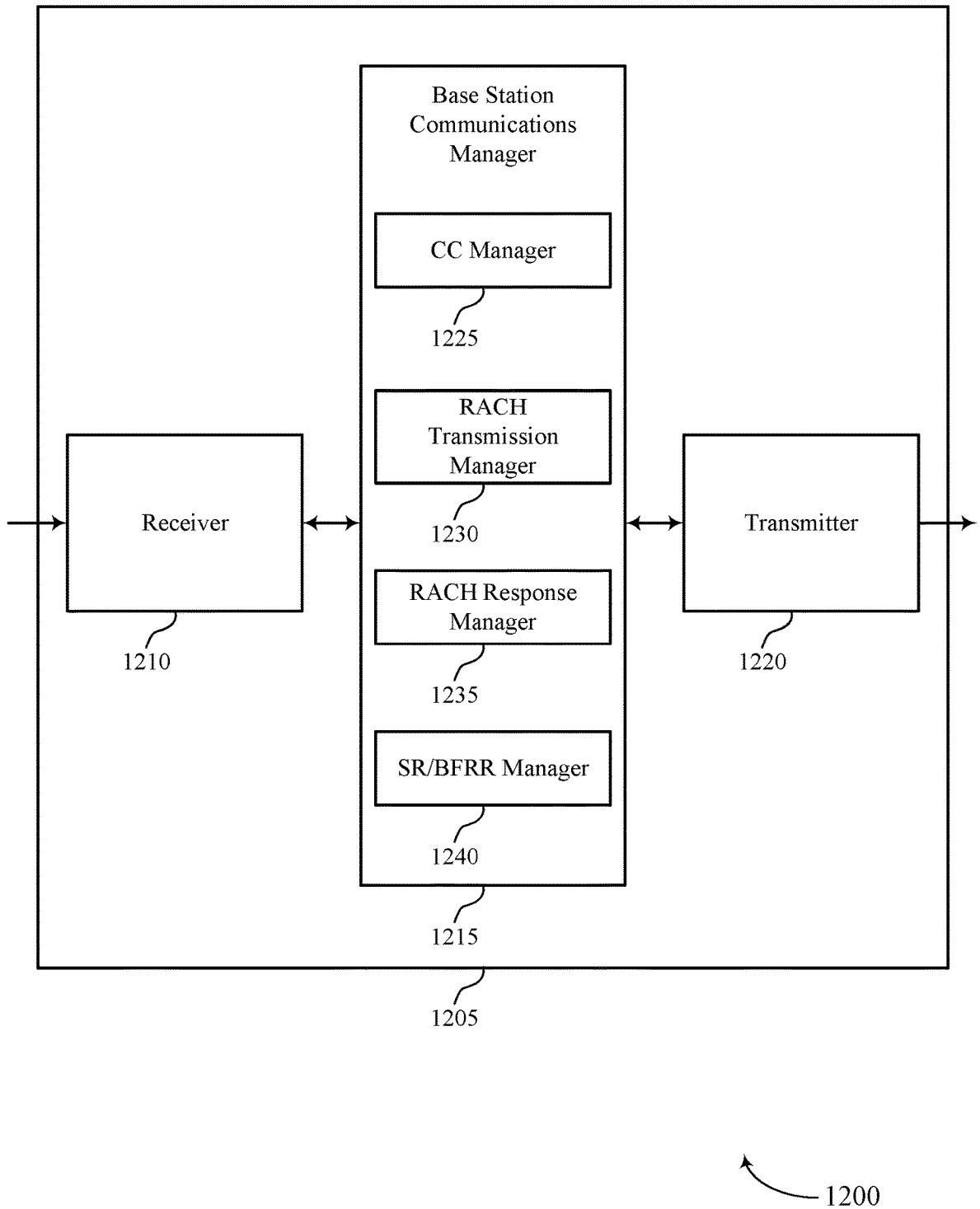

FIG. 12 shows a block diagram 1200 of a wireless device 1205 that supports RACH procedures with multiple carriers in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to RACH procedures with multiple carriers, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include CC manager 1225, RACH transmission manager 1230, RACH response manager 1235, and SR/BFRR manager 1240.

CC manager 1225 may transmit an indication of a set of component carriers for a UE to use to receive, from a second base station, a response to a first RACH transmission, receive, from a UE an indication of a set of component carriers that the UE can use to receive a response to a RACH transmission from the base station, and transmit, to a UE, an indication of a set of component carriers that the UE can use to transmit scheduling requests or beam-failure recovery requests to the base station.

RACH transmission manager 1230 may receive the first RACH transmission from the UE and receive a first RACH transmission from the UE.

RACH response manager 1235 may transmit, using one or more of the set of component carriers, a second RACH transmission in response to the received first RACH transmission and transmit, to the UE using one or more of the set of component carriers, a second RACH transmission in response to the first RACH transmission.

SR/BFRR manager 1240 may receive, based on the transmitted indication and using one or more component carriers of the indicated set of component carriers, a scheduling request or a beam-failure recovery request from the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
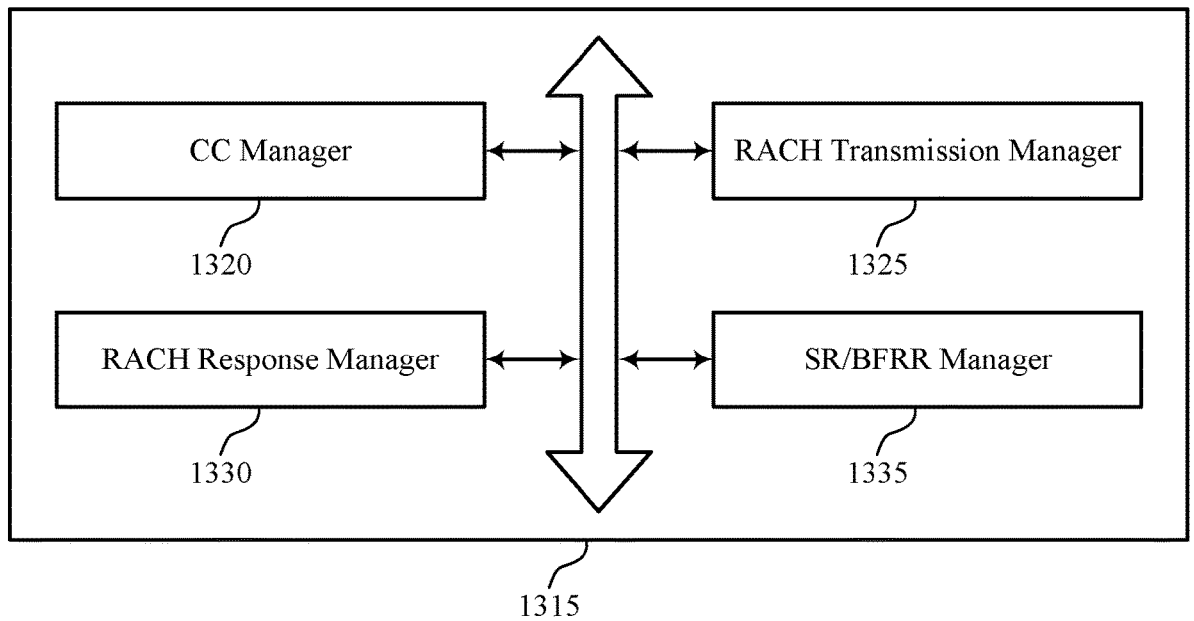

FIG. 13 shows a block diagram 1300 of a base station communications manager 1315 that supports RACH procedures with multiple carriers in accordance with aspects of the present disclosure. The base station communications manager 1315 may be an example of aspects of a base station communications manager 1415 described with reference to FIGS. 11, 12, and 14. The base station communications manager 1315 may include CC manager 1320, RACH transmission manager 1325, RACH response manager 1330, and SR/BFRR manager 1335. Each of these modules may communicate, directly or indirectly, with one another (e.g., via one or more buses).

CC manager 1320 may transmit an indication of a set of component carriers for a UE to use to receive, from a second base station, a response to a first RACH transmission, receive, from a UE an indication of a set of component carriers that the UE can use to receive a response to a RACH transmission from the base station, and transmit, to a UE, an indication of a set of component carriers that the UE can use to transmit scheduling requests or beam-failure recovery requests to the base station.

RACH transmission manager 1325 may receive the first RACH transmission from the UE and receive a first RACH transmission from the UE.

RACH response manager 1330 may transmit, using one or more of the set of component carriers, a second RACH transmission in response to the received first RACH transmission and transmit, to the UE using one or more of the set of component carriers, a second RACH transmission in response to the first RACH transmission.

SR/BFRR manager 1335 may receive, based on the transmitted indication and using one or more component carriers of the indicated set of component carriers, a scheduling request or a beam-failure recovery request from the UE.

Figure 14:
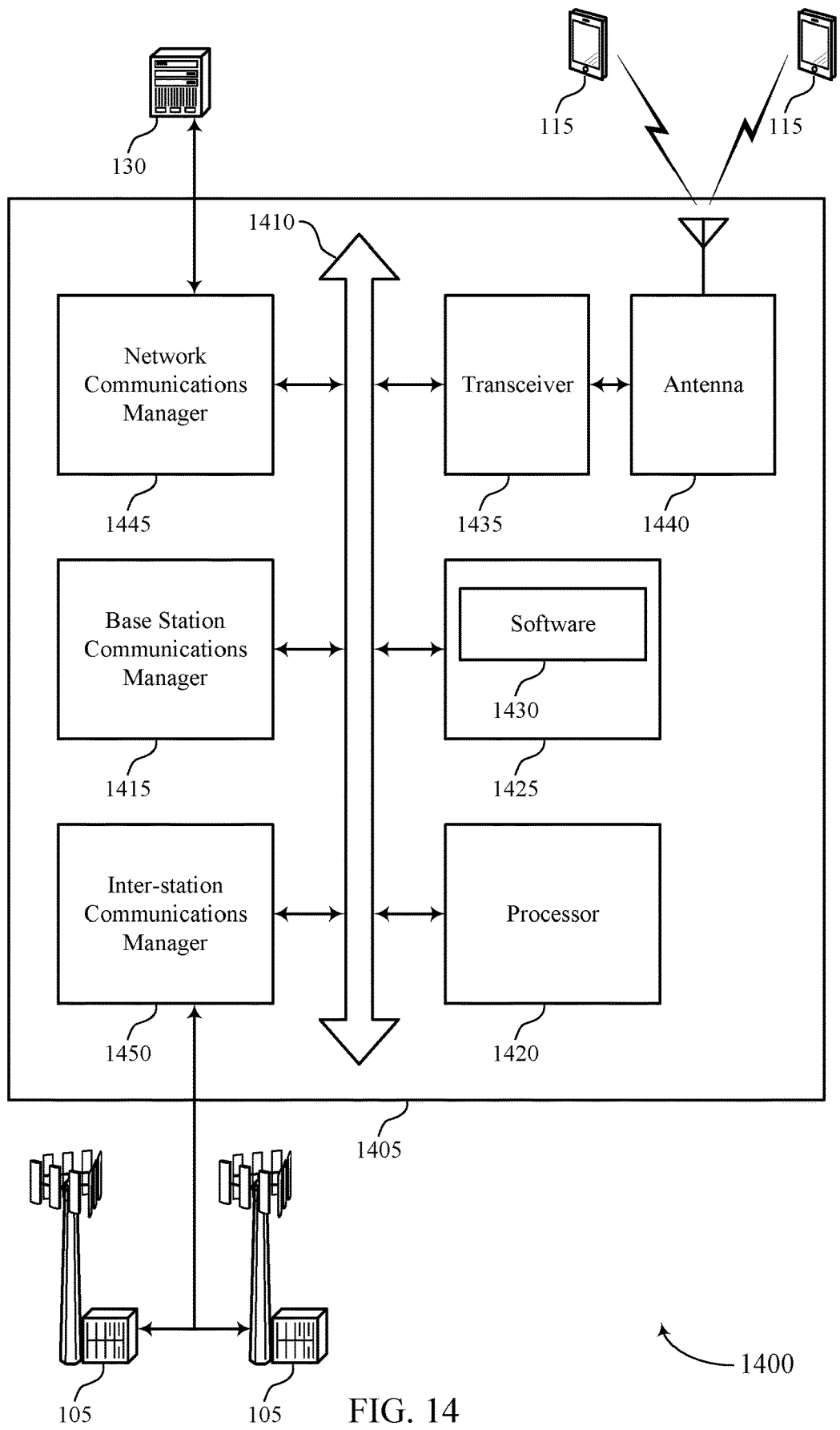
FIG. 14 illustrates a block diagram of a system including a base station that supports RACH procedures with multiple carriers in accordance with aspects of the present disclosure.

FIG. 14 shows a diagram of a system 1400 including a device 1405 that supports RACH procedures with multiple carriers in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting RACH procedures with multiple carriers).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support RACH procedures with multiple carriers. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
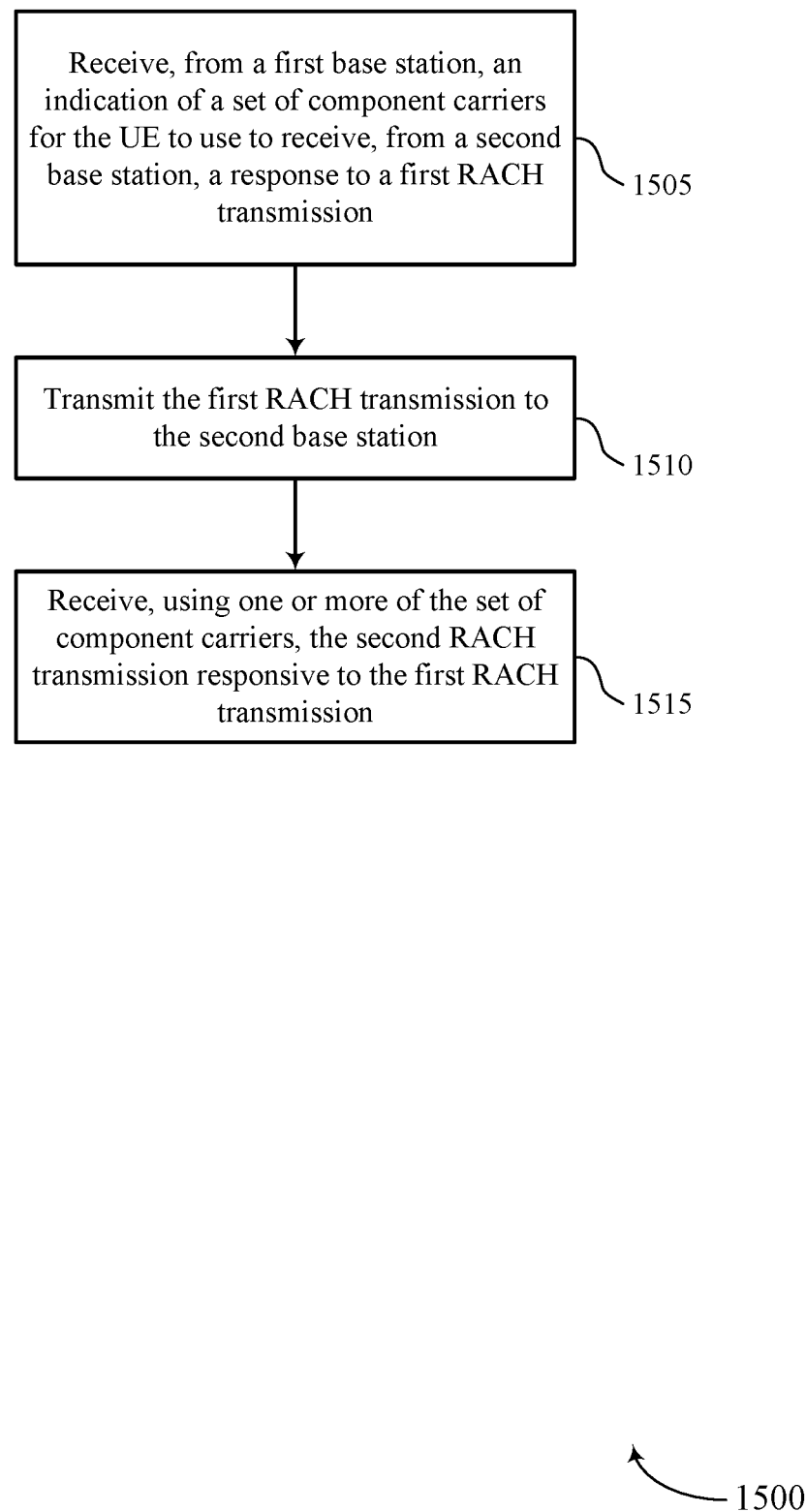
FIGS. 15 through 22 illustrate methods for RACH procedures with multiple carriers in accordance with aspects of the present disclosure.

FIG. 15 shows a flowchart illustrating a method 1500 for RACH procedures with multiple carriers in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, from a first base station, an indication of a set of component carriers for the UE to use to receive, from a second base station, a response to a first RACH transmission. The operations of block 1505 may be performed according to the methods described herein. In certain examples, aspects of the operations of block 1505 may be performed by a CC manager as described with reference to FIGS. 7 through 10.

At block 1510 the UE 115 may transmit the first RACH transmission to the second base station. The operations of block 1510 may be performed according to the methods described herein. In certain examples, aspects of the operations of block 1510 may be performed by a RACH transmission manager as described with reference to FIGS. 7 through 10.

At block 1515 the UE 115 may receive, using one or more of the set of component carriers, the second RACH transmission responsive to the first RACH transmission. The operations of block 1515 may be performed according to the methods described herein. In certain examples, aspects of the operations of block 1515 may be performed by a RACH response manager as described with reference to FIGS. 7 through 10.

Figure 16:
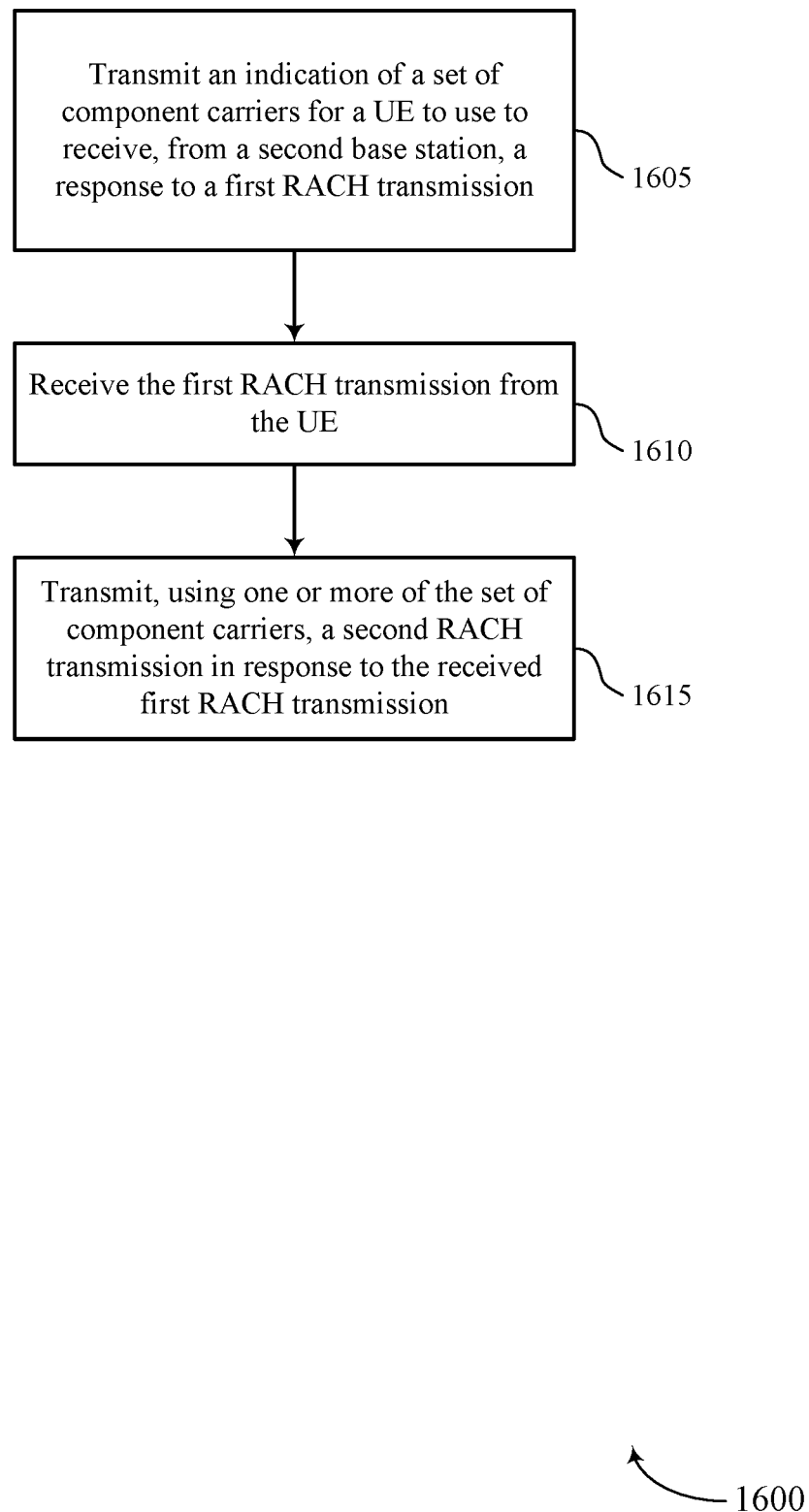

FIG. 16 shows a flowchart illustrating a method 1600 for RACH procedures with multiple carriers in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit an indication of a set of component carriers for a UE to use to receive, from a second base station, a response to a first RACH transmission. The operations of block 1605 may be performed according to the methods described herein. In certain examples, aspects of the operations of block 1605 may be performed by a CC manager as described with reference to FIGS. 11 through 14.

At block 1610 the base station 105 may receive the first RACH transmission from the UE. The operations of block 1610 may be performed according to the methods described herein. In certain examples, aspects of the operations of block 1610 may be performed by a RACH transmission manager as described with reference to FIGS. 11 through 14.

At block 1615 the base station 105 may transmit, using one or more of the set of component carriers, a second RACH transmission in response to the received first RACH transmission. The operations of block 1615 may be performed according to the methods described herein. In certain examples, aspects of the operations of block 1615 may be performed by a RACH response manager as described with reference to FIGS. 11 through 14.

Figure 17:
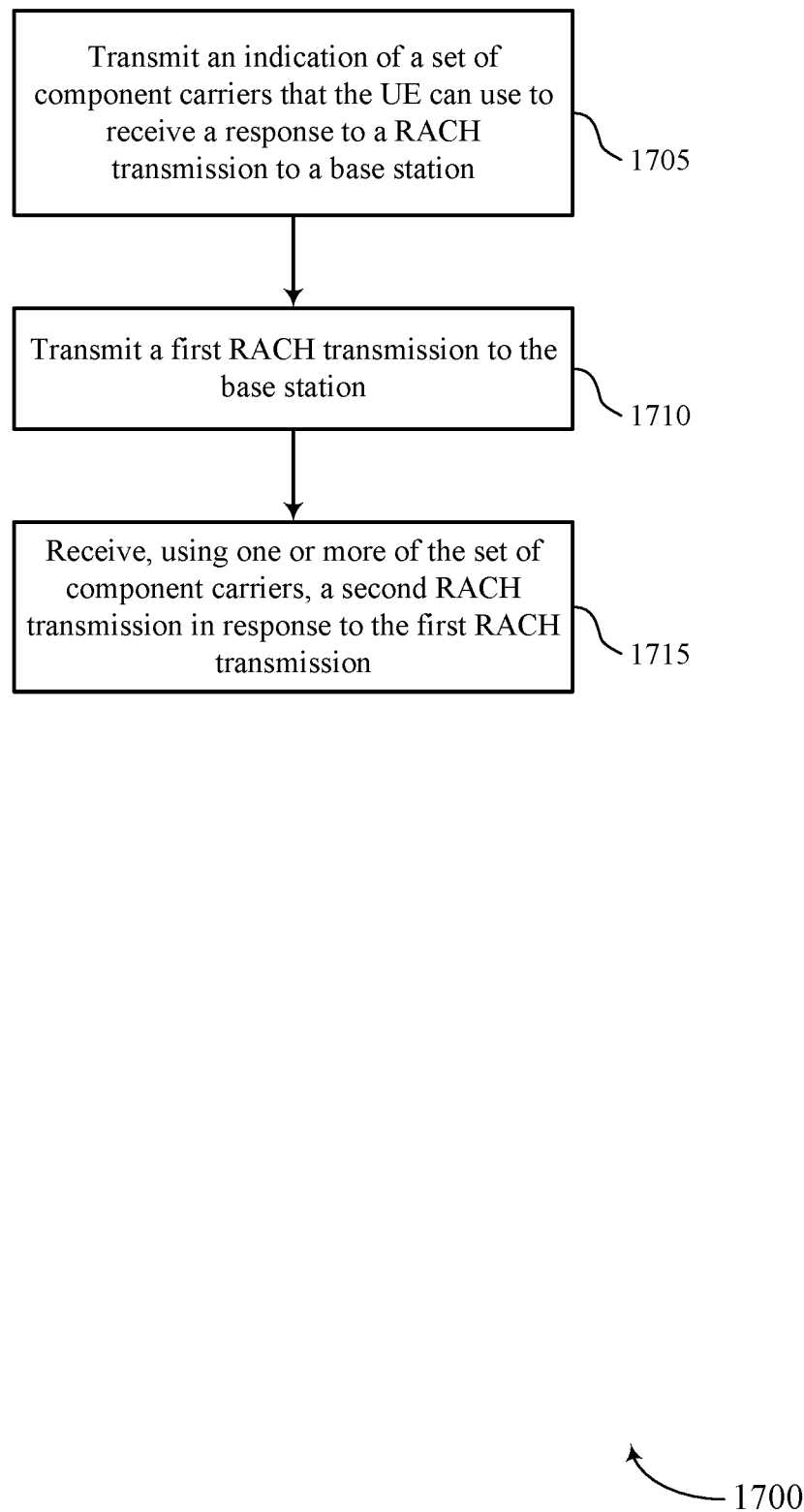

FIG. 17 shows a flowchart illustrating a method 1700 for RACH procedures with multiple carriers in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may transmit an indication of a set of component carriers that the UE can use to receive a response to a RACH transmission to a base station. The operations of block 1705 may be performed according to the methods described herein. In certain examples, aspects of the operations of block 1705 may be performed by a CC manager as described with reference to FIGS. 7 through 10.

At block 1710 the UE 115 may transmit a first RACH transmission to the base station. The operations of block 1710 may be performed according to the methods described herein. In certain examples, aspects of the operations of block 1710 may be performed by a RACH transmission manager as described with reference to FIGS. 7 through 10.

At block 1715 the UE 115 may receive, using one or more of the set of component carriers, a second RACH transmission in response to the first RACH transmission. The operations of block 1715 may be performed according to the methods described herein. In certain examples, aspects of the operations of block 1715 may be performed by a RACH response manager as described with reference to FIGS. 7 through 10.

Figure 18:
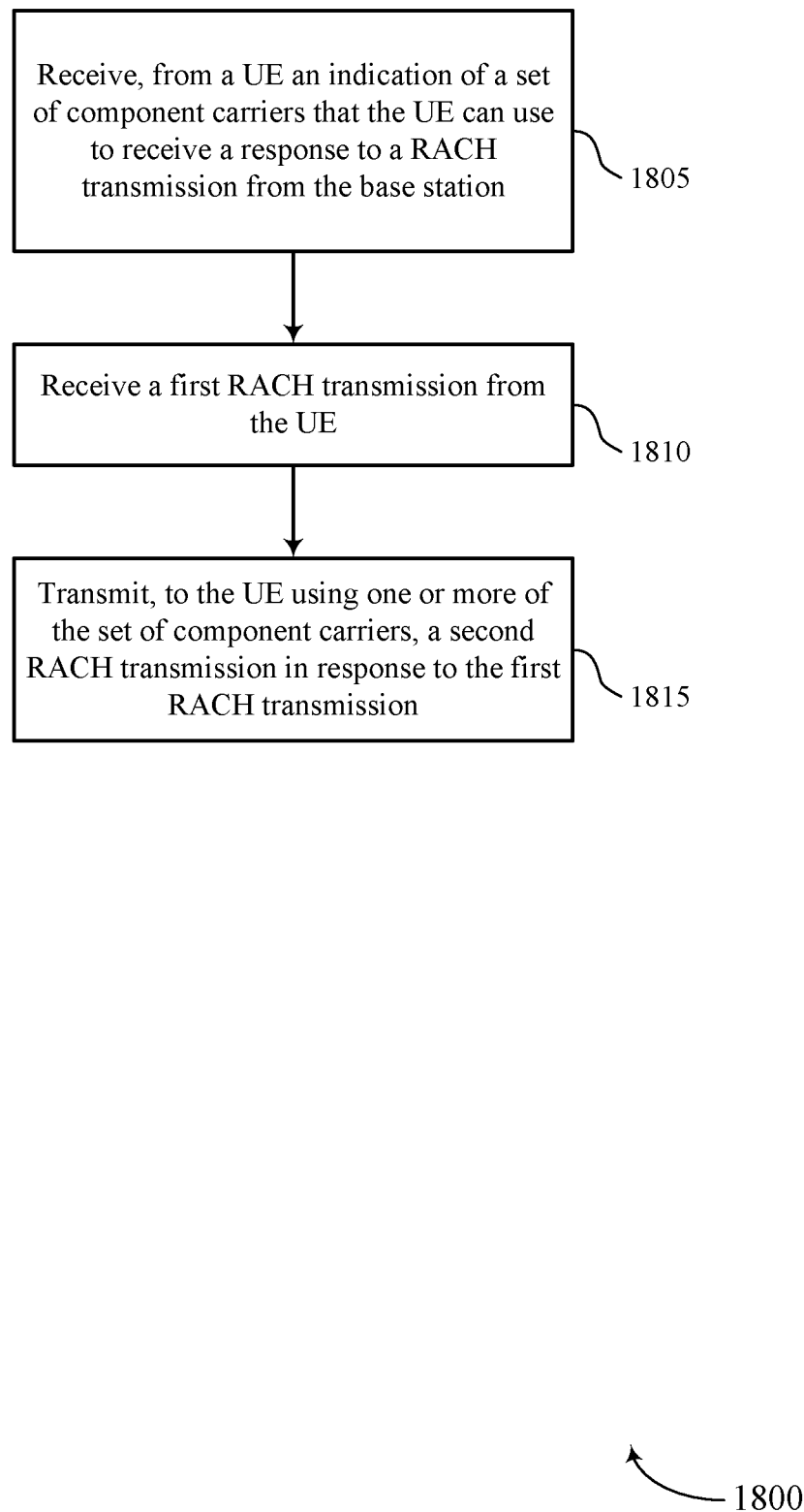

FIG. 18 shows a flowchart illustrating a method 1800 for RACH procedures with multiple carriers in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive, from a user equipment (UE) an indication of a set of component carriers that the UE can use to receive a response to a RACH transmission from the base station. The operations of block 1805 may be performed according to the methods described herein. In certain examples, aspects of the operations of block 1805 may be performed by a CC manager as described with reference to FIGS. 11 through 14.

At block 1810 the base station 105 may receive a first RACH transmission from the UE. The operations of block 1810 may be performed according to the methods described herein. In certain examples, aspects of the operations of block 1810 may be performed by a RACH transmission manager as described with reference to FIGS. 11 through 14.

At block 1815 the base station 105 may transmit, to the UE using one or more of the set of component carriers, a second RACH transmission in response to the first RACH transmission. The operations of block 1815 may be performed according to the methods described herein. In certain examples, aspects of the operations of block 1815 may be performed by a RACH response manager as described with reference to FIGS. 11 through 14.

Figure 19:
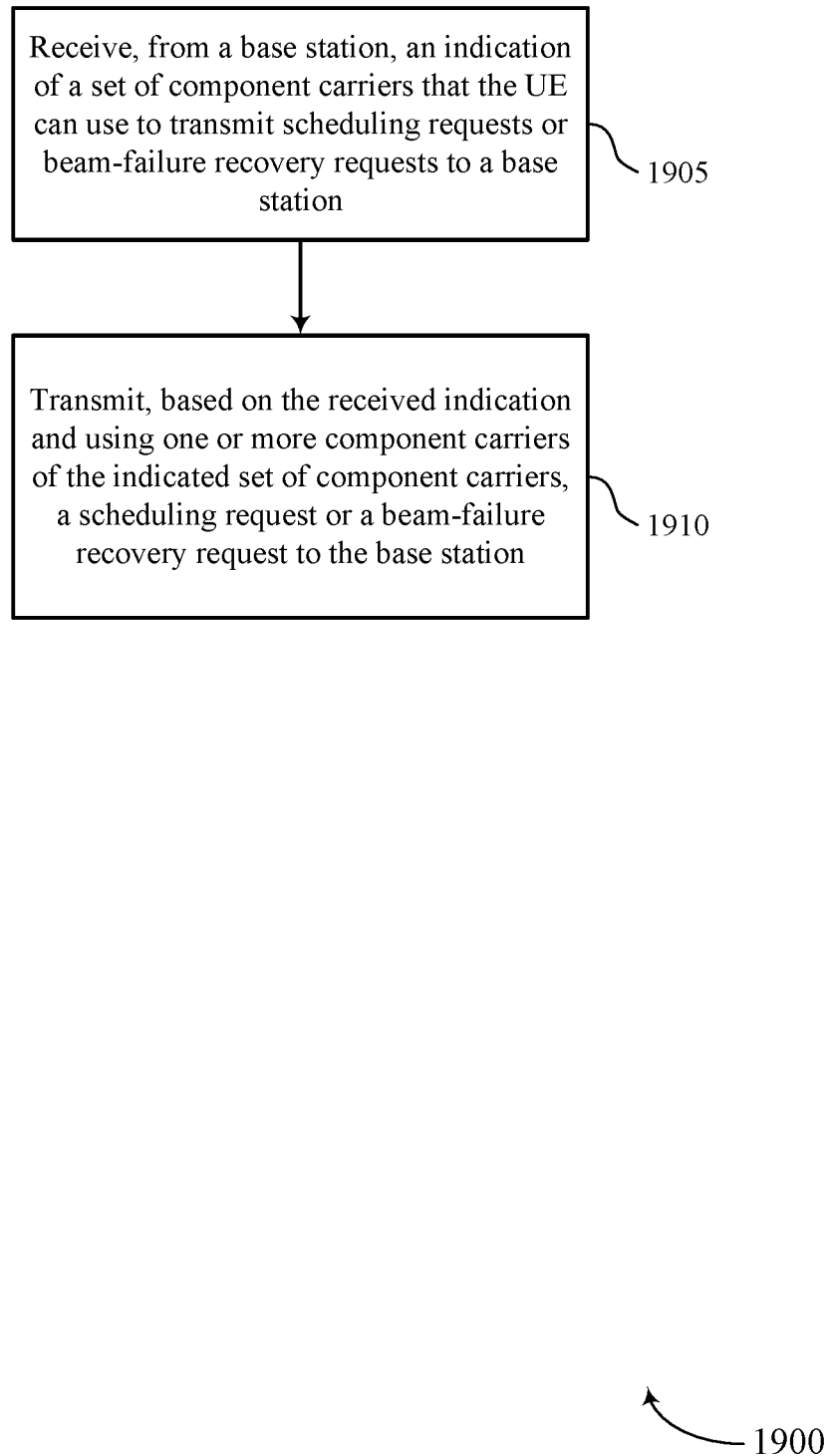

FIG. 19 shows a flowchart illustrating a method 1900 for RACH procedures with multiple carriers in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, from a base station, an indication of a set of component carriers that the UE can use to transmit scheduling requests or beam-failure recovery requests to a base station. The operations of block 1905 may be performed according to the methods described herein. In certain examples, aspects of the operations of block 1905 may be performed by a CC manager as described with reference to FIGS. 7 through 10.

At block 1910 the UE 115 may transmit, based at least in part on the received indication and using one or more component carriers of the indicated set of component carriers, a scheduling request or a beam-failure recovery request to the base station. The operations of block 1910 may be performed according to the methods described herein. In certain examples, aspects of the operations of block 1910 may be performed by a SR/BFRR manager as described with reference to FIGS. 7 through 10.

Figure 20:
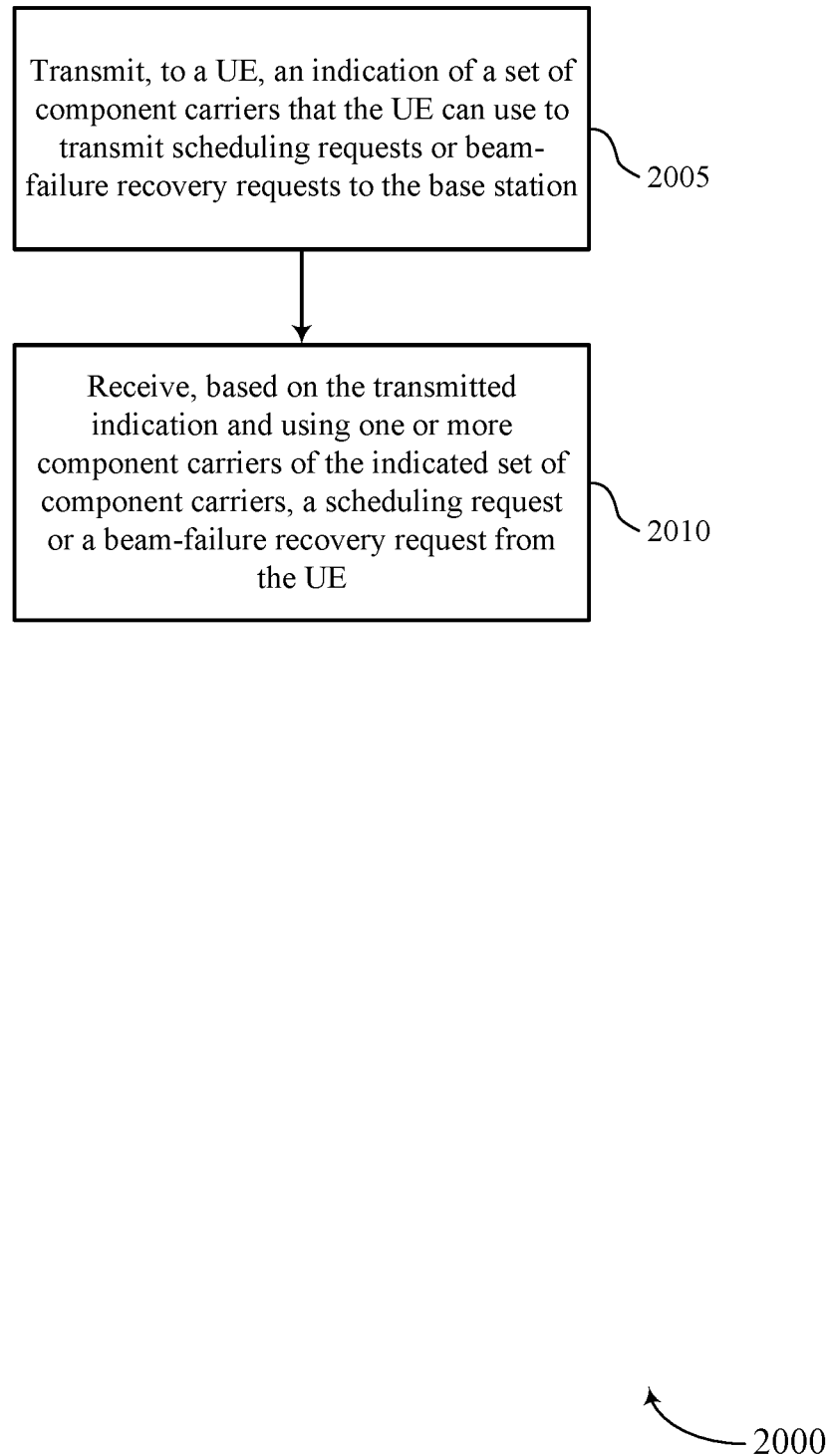

FIG. 20 shows a flowchart illustrating a method 2000 for RACH procedures with multiple carriers in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit, to a user equipment (UE), an indication of a set of component carriers that the UE can use to transmit scheduling requests or beam-failure recovery requests to the base station. The operations of block 2005 may be performed according to the methods described herein. In certain examples, aspects of the operations of block 2005 may be performed by a CC manager as described with reference to FIGS. 11 through 14.

At block 2010 the base station 105 may receive, based at least in part on the transmitted indication and using one or more component carriers of the indicated set of component carriers, a scheduling request or a beam-failure recovery request from the UE. The operations of block 2010 may be performed according to the methods described herein. In certain examples, aspects of the operations of block 2010 may be performed by a SR/BFRR manager as described with reference to FIGS. 11 through 14.

Figure 21:
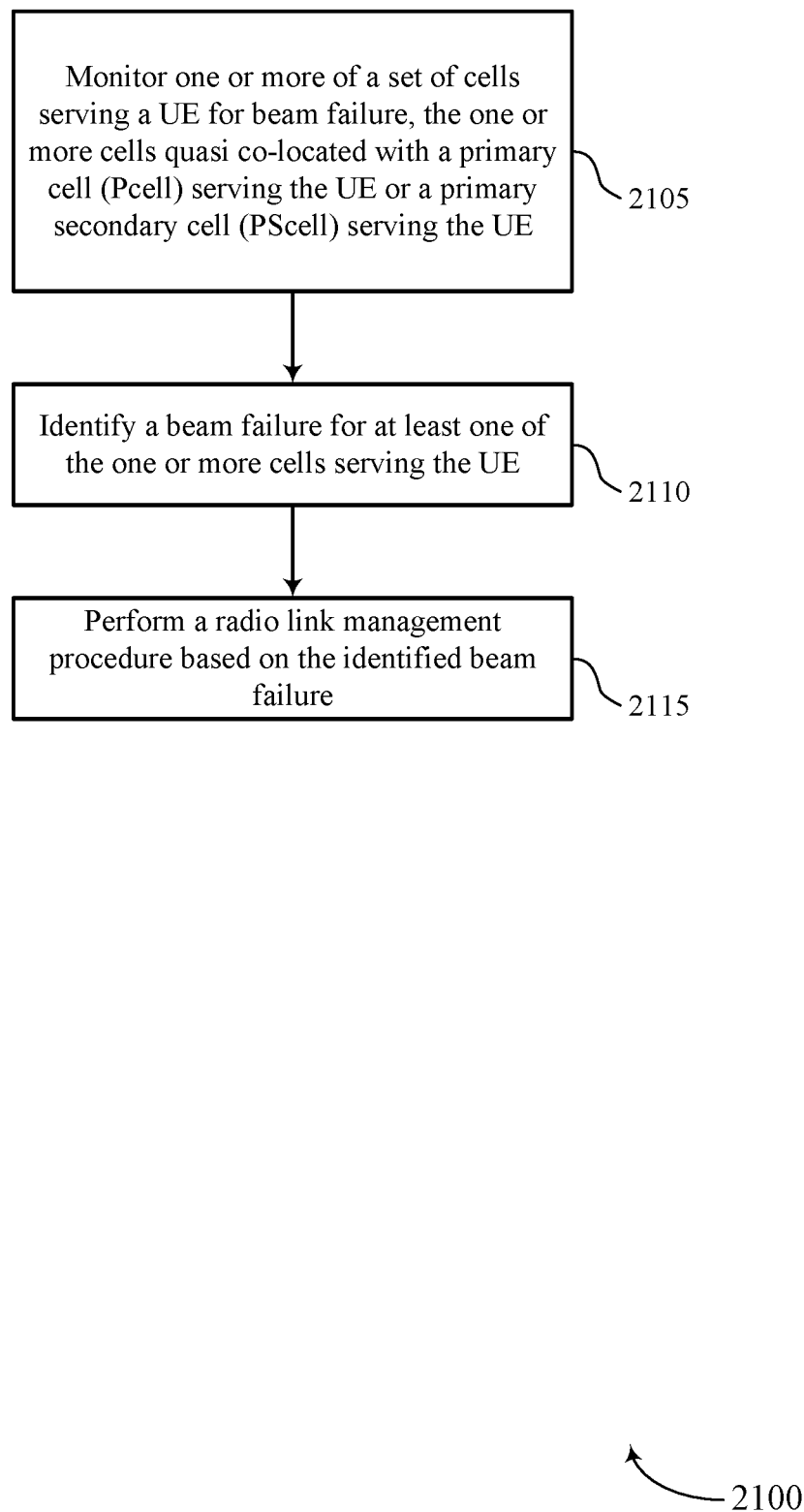

FIG. 21 shows a flowchart illustrating a method 2100 for RACH procedures with multiple carriers in accordance with aspects of the present disclosure. The operations of method 2100 may be implemented by a UE 115 or its components as described herein. For example, the operations of method 2100 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may monitor one or more of a plurality of cells serving a user equipment (UE) for beam failure, the one or more cells quasi co-located with a PCell serving the UE or a PSCell serving the UE. The operations of block 2105 may be performed according to the methods described herein. In certain examples, aspects of the operations of block 2105 may be performed by a beam failure manager as described with reference to FIGS. 7 through 10.

At block 2110 the UE 115 may identify a beam failure for at least one of the one or more cells serving the UE. The operations of block 2110 may be performed according to the methods described herein. In certain examples, aspects of the operations of block 2110 may be performed by a beam failure manager as described with reference to FIGS. 7 through 10.

At block 2115 the UE 115 may perform a radio link management procedure based at least in part on the identified beam failure. The operations of block 2115 may be performed according to the methods described herein. In certain examples, aspects of the operations of block 2115 may be performed by a RLM manager as described with reference to FIGS. 7 through 10.

Figure 22:
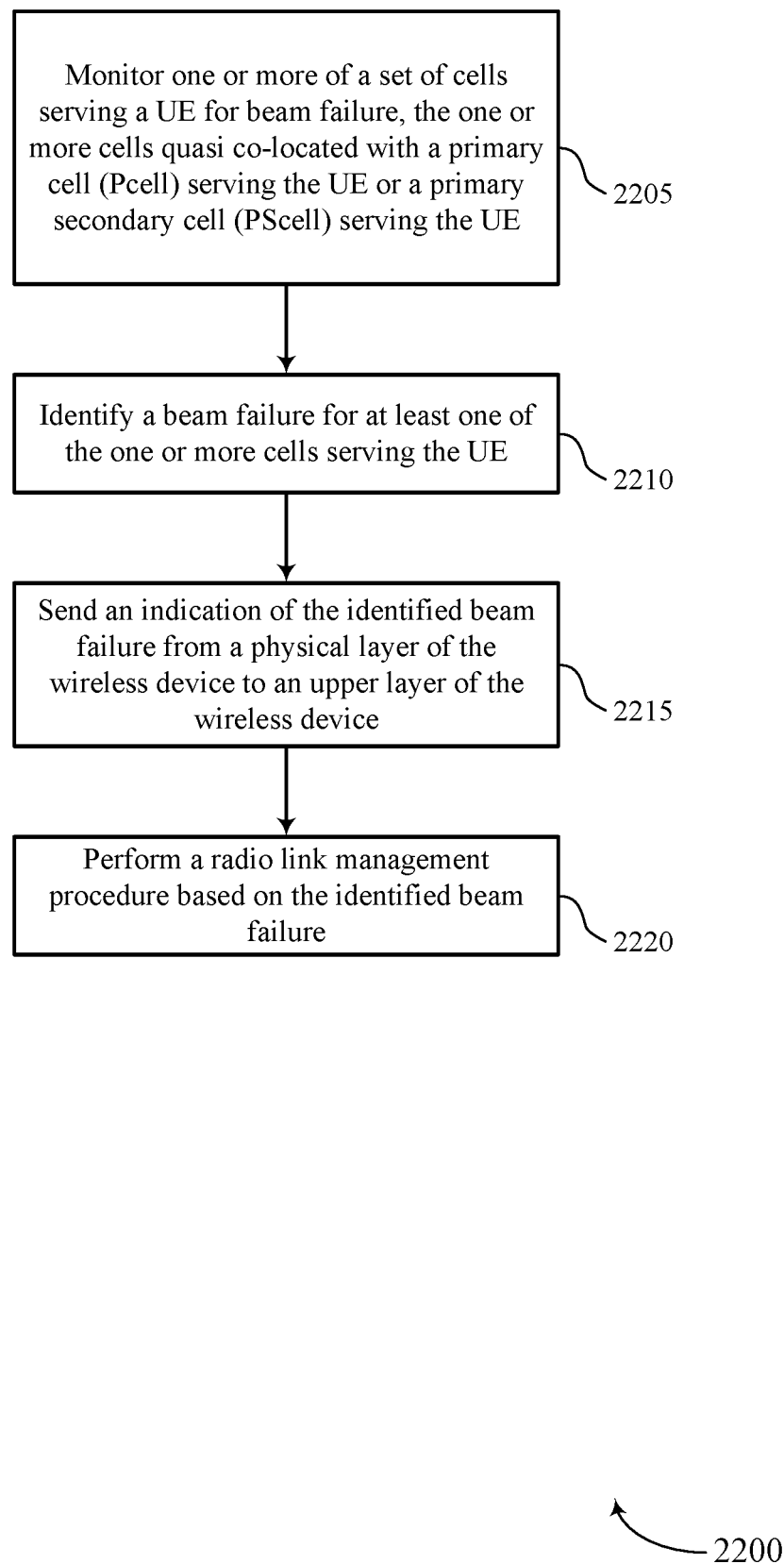

FIG. 22 shows a flowchart illustrating a method 2200 for RACH procedures with multiple carriers in accordance with aspects of the present disclosure. The operations of method 2200 may be implemented by a UE 115 or its components as described herein. For example, the operations of method 2200 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may monitor one or more of a plurality of cells serving a UE for beam failure, the one or more cells quasi co-located with a PCell serving the UE or a PSCell serving the UE. The operations of block 2205 may be performed according to the methods described herein. In certain examples, aspects of the operations of block 2205 may be performed by a beam failure manager as described with reference to FIGS. 7 through 10.

At block 2210 the UE 115 may identify a beam failure for at least one of the one or more cells serving the UE. The operations of block 2210 may be performed according to the methods described herein. In certain examples, aspects of the operations of block 2210 may be performed by a beam failure manager as described with reference to FIGS. 7 through 10.

At block 2215 the UE 115 may send an indication of the identified beam failure from a physical layer of the wireless device to an upper layer of the wireless device. The operations of block 2215 may be performed according to the methods described herein. In certain examples, aspects of the operations of block 2215 may be performed by a beam failure manager as described with reference to FIGS. 7 through 10.

At block 2220 the UE 115 may perform a radio link management procedure based at least in part on the identified beam failure. The operations of block 2220 may be performed according to the methods described herein. In certain examples, aspects of the operations of block 2220 may be performed by a RLM manager as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from an access network entity, an indication that indicates that at least one component carrier is selected for the UE to use to transmit a beam-failure recovery request to the access network entity; and
transmitting, based at least in part on the indication and using one or more component carriers of the at least one component carrier, the beam-failure recovery request to the access network entity.

2. The method of claim 1, wherein the indication of the at least one component carrier comprises an instruction to transmit the beam-failure recovery request for a single component carrier of the at least one component carrier.

3. The method of claim 1, wherein the indication of the at least one component carrier comprises an instruction to transmit the beam-failure recovery request for the at least one component carrier.

4. The method of claim 1, wherein transmitting the beam-failure recovery request to the access network entity comprises:
identifying loss of beam synchronization for a single component carrier of the at least one component carrier; and
transmitting the beam-failure recovery request for the single component carrier.

5. The method of claim 1, wherein transmitting the beam-failure recovery request to the access network entity comprises:
identifying loss of beam synchronization for a single component carrier of the at least one component carrier; and
transmitting the beam-failure recovery request for the at least one component carrier.

6. The method of claim 1, further comprising:
receiving, from the access network entity, a quasi co-location indication, the quasi co-location indication indicating a quasi co-location relationship among the at least one component carrier.

7. The method of claim 1, further comprising:
monitoring for beam failure of at least one component carrier for each group of component carriers of the at least one component carrier.

8. An apparatus for wireless communication at a user equipment (UE), comprising:
one or more processors;
memory coupled with the one or more processors; and
instructions stored in the memory and executable by the one or more processors to cause the apparatus to:
receive, from an access network entity, an indication that indicates that at least one component carrier is selected for the UE to use to transmit a beam-failure recovery request to the access network entity; and
transmit, based at least in part on the indication and using one or more component carriers of the at least one component carrier, the beam-failure recovery request to the access network entity.

9. The apparatus of claim 8, wherein the indication of the at least one component carrier comprises an instruction to transmit the beam-failure recovery request for a single component carrier of the at least one component carrier.

10. The apparatus of claim 8, wherein the indication of the at least one component carrier comprises an instruction to transmit the beam-failure recovery request for the at least one component carrier.

11. The apparatus of claim 8, wherein the instructions to transmit the beam-failure recovery request to the access network entity are executable by the one or more processors to cause the apparatus to:
identify loss of beam synchronization for a single component carrier of the at least one component carrier; and
transmit the beam-failure recovery request for the single component carrier.

12. The apparatus of claim 8, wherein the instructions to transmit the beam-failure recovery request to the access network entity are executable by the one or more processors to cause the apparatus to:
identify loss of beam synchronization for a single component carrier of the at least one component carrier; and
transmit the beam-failure recovery request for the at least one component carrier.

13. The apparatus of claim 8, wherein the instructions are further executable by the one or more processors to cause the apparatus to:

receive, from the access network entity, a quasi co-location indication, the quasi co-location indication indicating a quasi co-location relationship among the at least one component carrier.

14. The apparatus of claim 8, wherein the instructions are further executable by the one or more processors to cause the apparatus to:
monitor for beam failure of at least one component carrier for each group of component carriers of the at least one component carrier.

15. An apparatus for wireless communication at a user equipment (UE), comprising:
means for receiving, from an access network entity, an indication that indicates that at least one component carrier is selected for the UE to use to transmit a beam-failure recovery request to the access network entity; and
means for transmitting, based at least in part on the indication and using one or more component carriers of the at least one component carrier, the beam-failure recovery request to the access network entity.

16. The apparatus of claim 15, wherein the indication of the at least one component carrier comprises an instruction to transmit the beam-failure recovery request for a single component carrier of the at least one component carrier.

17. The apparatus of claim 15, wherein the indication of the at least one component carrier comprises an instruction to transmit the beam-failure recovery request for the at least one component carrier.

18. The apparatus of claim 15, wherein the means for transmitting the beam-failure recovery request to the access network entity comprise:
means for identifying loss of beam synchronization for a single component carrier of the at least one component carrier; and
means for transmitting the beam-failure recovery request for the single component carrier.

19. The apparatus of claim 15, wherein the means for transmitting the beam-failure recovery request to the access network entity comprise:
means for identifying loss of beam synchronization for a single component carrier of the at least one component carrier; and
means for transmitting the beam-failure recovery request for the at least one component carrier.

20. The apparatus of claim 15, further comprising:
means for receiving, from the access network entity, a quasi co-location indication, the quasi co-location indication indicating a quasi co-location relationship among the at least one component carrier.

21. A non-transitory computer-readable medium storing code for wireless communication at a user equipment (UE), the code comprising instructions executable by a processor to:
receive, from an access network entity, an indication that indicates that at least one component carrier is selected for the UE to use to transmit a beam-failure recovery request to the access network entity; and
transmit, based at least in part on the indication and using one or more component carriers of the at least one component carrier, the beam-failure recovery request to the access network entity.

22. The non-transitory computer-readable medium of claim 21, wherein the indication of the at least one component carrier comprises an instruction to transmit the beam-failure recovery request for a single component carrier of the at least one component carrier.

23. The non-transitory computer-readable medium of claim 21, wherein the indication of the at least one component carrier comprises an instruction to transmit the beam-failure recovery request for the at least one component carrier.

24. The non-transitory computer-readable medium of claim 21, wherein the instructions to transmit the beam-failure recovery request to the access network entity are executable by the processor to:
identify loss of beam synchronization for a single component carrier of the at least one component carrier; and
transmit the beam-failure recovery request for the single component carrier.

25. The non-transitory computer-readable medium of claim 21, wherein the instructions to transmit the beam-failure recovery request to the access network entity are executable by the processor to:
identify loss of beam synchronization for a single component carrier of the at least one component carrier; and
transmit the beam-failure recovery request for the at least one component carrier.

26. The non-transitory computer-readable medium of claim 21, wherein the instructions are further executable by the processor to:
receive, from the access network entity, a quasi co-location indication, the quasi co-location indication indicating a quasi co-location relationship among the at least one component carrier.

27. The method of claim 1, further comprising:
initiating a stored timer based at least in part on one or more identified beam failures, wherein transmitting the beam-failure recovery request is based at least in part on the one or more identified beam failures.

28. The apparatus of claim 8, wherein the instructions are further executable by the one or more processors to cause the apparatus to:
initiate a stored timer based at least in part on one or more identified beam failures, wherein transmitting the beam-failure recovery request is based at least in part on the one or more identified beam failures.

29. The apparatus of claim 15, further comprising:
means for initiating a stored timer based at least in part on one or more identified beam failures, wherein transmitting the beam-failure recovery request is based at least in part on the one or more identified beam failures.

30. The non-transitory computer-readable medium of claim 21, wherein the instructions are further executable by the processor to:
initiate a stored timer based at least in part on one or more identified beam failures, wherein transmitting the beam-failure recovery request is based at least in part on the one or more identified beam failures.

* * * * *